(12) United States Patent
Hong

(10) Patent No.: US 10,627,168 B2
(45) Date of Patent: *Apr. 21, 2020

(54) STAINLESS STEEL AND PIPE MADE THEREOF

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,601

(22) Filed: Dec. 18, 2017

(65) Prior Publication Data

US 2018/0106557 A1 Apr. 19, 2018

Related U.S. Application Data

(63) Continuation of application No. PCT/KR2016/012512, filed on Nov. 2, 2016.

(30) Foreign Application Priority Data

Mar. 28, 2016 (KR) .......................... 10-2016-0037029

(51) Int. Cl.
*F28F 1/08* (2006.01)
*F28F 21/08* (2006.01)
(Continued)

(52) U.S. Cl.
CPC ................ *F28F 1/08* (2013.01); *C21D 6/004* (2013.01); *C21D 8/0226* (2013.01); *C21D 8/105* (2013.01);
(Continued)

(58) Field of Classification Search
CPC .......... C21D 6/004; C21D 8/10; C21D 8/105; C21D 9/08; C21D 9/085; C21D 9/10;
(Continued)

(56) References Cited

U.S. PATENT DOCUMENTS 3,152,934 A * 10/1964 Lula ........................ C22C 38/58
148/326
4,666,186 A * 5/1987 Twomey ................. F28F 1/003
285/14

(Continued)

FOREIGN PATENT DOCUMENTS

EP 2508639 A1 10/2012
EP 2 692 887 A1 2/2014
(Continued)

OTHER PUBLICATIONS

"Glossary of Metallurgical and Metalworking Terms," Metals Handbook, ASM Handbooks Online, ASM International, 2002, pp. 1, 120, 121, 257. (Year: 2002).*

(Continued)

*Primary Examiner* — Vanessa T. Luk
(74) *Attorney, Agent, or Firm* — Dentons US LLP

(57) ABSTRACT

Disclosed are a stainless steel having a new composition, which has properties of low strength as compared with a conventional stainless steel, that includes, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, N: 0.03% or less, residue: Fe, and incidental impurities, and has an austenite matrix structure and an average diameter of 30 to 60 μm, and a system such as an air conditioner including the stainless steel thereof.

6 Claims, 22 Drawing Sheets

(51) Int. Cl.

| | | |
|---|---|---|
| *C22C 38/00* | (2006.01) | |
| *C22C 38/42* | (2006.01) | |
| *C22C 38/58* | (2006.01) | |
| *C22C 38/02* | (2006.01) | |
| *C22C 38/04* | (2006.01) | |
| *C21D 9/46* | (2006.01) | |
| *C21D 8/10* | (2006.01) | |
| *F28F 1/40* | (2006.01) | |
| *C21D 8/02* | (2006.01) | |
| *F28F 1/42* | (2006.01) | |
| *F28D 1/047* | (2006.01) | |
| *C21D 6/00* | (2006.01) | |
| *C22C 38/44* | (2006.01) | |
| *F28D 21/00* | (2006.01) | |
| *F16L 9/17* | (2006.01) | |
| *F16L 9/00* | (2006.01) | |

(52) U.S. Cl.
CPC .............. *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/42* (2013.01); *C22C 38/44* (2013.01); *C22C 38/58* (2013.01); *F28D 1/0477* (2013.01); *F28F 1/40* (2013.01); *F28F 1/426* (2013.01); *F28F 21/083* (2013.01); *C21D 2211/001* (2013.01); *F16L 9/006* (2013.01); *F16L 9/17* (2013.01); *F28D 2021/0068* (2013.01); *F28F 2210/06* (2013.01)

(58) Field of Classification Search
CPC ... C21D 9/12; C21D 9/14; C21D 9/50; C21D 9/505; C21D 2211/001; C22C 38/42; C22C 38/58; F16L 9/02; F16L 9/04; F16L 9/042; F16L 9/045; F16L 9/047; F16L 9/06; F16L 9/16; F16L 9/165; F16L 9/17; F16L 55/09; F28D 2021/0038; F28D 2021/0068; F28F 21/083
See application file for complete search history.

(56) References Cited

U.S. PATENT DOCUMENTS

| | | | | |
|---|---|---|---|---|
| 5,429,183 | A * | 7/1995 | Hisamori | F28D 9/005 165/134.1 |
| 5,571,343 | A * | 11/1996 | Ryoo | C22C 38/42 148/325 |
| 5,614,149 | A | 3/1997 | Abe et al. | |
| 2003/0183292 | A1 | 10/2003 | Otsuka et al. | |
| 2010/0054983 | A1* | 3/2010 | Osuki | C22C 38/001 420/38 |
| 2011/0023990 | A1* | 2/2011 | Yano | B21C 37/0811 138/156 |
| 2011/0214847 | A1* | 9/2011 | Hur | F28D 7/106 165/143 |
| 2012/0055660 | A1* | 3/2012 | Walker | B21D 53/06 165/172 |
| 2017/0349985 | A1* | 12/2017 | Kang | C22C 38/42 |

FOREIGN PATENT DOCUMENTS

| | | | |
|---|---|---|---|
| EP | 3396000 A1 | 10/2018 | |
| JP | 5863770 B2 | 2/2016 | |
| KR | 10-2003-0074232 A | 9/2003 | |
| KR | 10-2013-0045931 A | 5/2013 | |
| KR | 10-2013-0053621 A | 5/2013 | |
| KR | 10-2014-0026607 A | 3/2014 | |
| KR | 10-1550738 B1 | 9/2015 | |
| KR | 101550738 B1 * | 9/2015 | ............. C22C 38/42 |
| WO | 2012/132679 A1 | 10/2012 | |
| WO | WO-2016104974 A1 * | 6/2016 | ............. C22C 38/42 |

OTHER PUBLICATIONS

R.E. Napolitano, Measurement of ASTM Grain Size Number, Iowa State University, ASTM E112 Tables, accessed on Sep. 20, 2008, publication date unknown. (Year: 2008).*

* cited by examiner

STAINLESS STEEL AND PIPE MADE THEREOF

This application is a Continuation Bypass of International Application No. PCT/KR2016/012512, filed Nov. 2, 2016, which claims the benefit of Korean Patent Application No. 10-2016-0037029, filed Mar. 28, 2016, all of which are hereby incorporated by reference as if fully set forth herein.

TECHNICAL FIELD

The present invention relates to a stainless steel, a pipe made thereof, a system such as an air conditioner including the pipe, and a method of manufacturing the same.

BACKGROUND ART

An air conditioner is an apparatus that cools or heats indoor space by using a refrigeration cycle. The refrigeration cycle includes a compressor, a condenser, an expansion device and an evaporator that are sequentially connected to each other by pipes. A refrigerant circulates the compressor, the condenser, the expansion device, and the evaporator through the pipes.

A flow path is formed in the condenser and the evaporator in the refrigeration cycle. The refrigerant is heat-exchanged with surroundings while passing through the flow path formed in the condenser and the evaporator to be condensed or evaporated, and the condenser and the evaporator serve as a heat exchanger. The flow path is used to allow the refrigerant to flow therethrough, and the refrigerant flows in the flow path. Hence, the flow path is a concept that is included in the meaning of the term the pipe in a broad sense.

Pipes connect the components of the refrigeration cycle to each other, and are used as a flow path of the compressor and the condenser. Conventional pipes are typically made of a copper (Cu) material. However, pipes made of copper may have a few problems.

First, copper has a limitation in reliability due to corrosion. For example, in the case of a chiller heat transfer pipe, the chiller heat transfer pipe is cleaned or replaced to remove scales, etc. therein.

Next, copper does not have a sufficiently high pressure resistance property when it is used for a flow path of a new high-pressure refrigerant such as R32. If a pipe made of copper is used as a flow path of a new high-pressure refrigerant, the pipe may not endure high pressure and may thus be damaged as time elapses.

In order to address such problems of copper pipes, Korean Patent Laid-Open Publication No. 2003-0074232 discloses a stainless steel pipe, which is made of a stainless steel material. In general, stainless steel has a strong corrosion resistance and a sufficiently high pressure resistance property as compared with copper. Thus, tubes or pipes made of stainless steel can address the problems of copper pipes, such as corrosion and damages at high pressure.

However, a conventional stainless steel material including the stainless steel pipe disclosed in Korean Patent Laid-Open Publication No. 2003-0074232 has properties of excessively high strength and hardness as compared with a copper material, and thus, may have a problem of processability, which may not be present in copper pipes.

Pipes used in an air conditioner are typically formed not only in a linear shape but also in a curved shape due to spatial constraints. In other words, one portion of the pipe may be formed in a linear shape, and another portion of the pipe may be formed in a curved shape. A linear pipe refers to a pipe extending in one direction along a straight line, and a curved pipe refers to a pipe curved along a curve.

However, since the conventional stainless steel material has properties of excessively high strength and hardness, it may be difficult to manufacture a pipe having a curved shape. For example, a linear pipe made of a stainless steel material is processed to have a curved pipe by applying a mechanical force to the linear pipe. However, as shown in FIG. 1, since the linear pipe is not completely plastically deformed but partially plastically deformed, and sufficient processing may not be performed to obtain a desired curved pipe.

Stainless steel has typically properties of high strength and high hardness, and thus, it may be difficult to improve the processability of a stainless steel material. Moreover, since pipes typically occupy 10% or more of the total material cost of an air conditioner, the demand for improving the performance of the pipes and reducing the cost of the pipes is continuously increasing.

DISCLOSURE OF THE INVENTION

Technical Problem

An object of the present invention is to provide a new stainless steel material having a new composition capable of preventing the problem of corrosion resistance and pressure resistance, which the copper material has, and solving the problem of high strength and high hardness, which the conventional stainless steel material.

Another object of the present invention is to provide a pipe capable of ensuring sufficient processability through a new stainless steel material that has excellent ductility as compared with the conventional stainless steel.

Still another object of the present invention is to provide a pipe made of a stainless steel material, and a system including the pipe.

Still another object of the present invention is to provide a process of manufacturing a pipe using a stainless steel material.

Still another object of the present invention is to provide a stainless steel pipe capable of being coupled to another pipe without being ruptured.

Still another object of the present invention is to provide the minimum thickness of a stainless steel pipe by calculating a limited pressure and a limited bending moment, which are similar to those of copper.

Technical Solution

To achieve these objects of the present invention, a stainless steel according to an embodiment of the present invention is defined by a composition, a matrix structure, and/or an average diameter thereof.

The stainless steel is composed of, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, N: 0.03% or less, residue: Fe, and incidental impurities.

The matrix structure of the stainless steel includes austenite. The matrix structure of stainless steel preferably includes only austenite. The matrix structure of the stainless steel may include austenite and δ-ferrite. In this case, austenite is to occupy most of the matrix structure based on the grain size area of the stainless steel. The stainless steel may have an austenite matrix structure of 99% or more based on the grain size area thereof, and have a δ-ferrite matrix structure of 1% or less based on the grain size area thereof.

The stainless steel has an average diameter of 30 to 60 μm. An American Society for Testing and Materials (ASTM) grain size number of the stainless steel corresponds to 5.0 to 7.0.

In addition, a pipe according to an embodiment of the present invention is made of the above-described stainless steel. Like the above-described stainless steel, the stainless steel is defined by a composition, a matrix structure, and an average diameter thereof. The pipe includes both a linear pipe and a bent pipe. The pipe made of the stainless steel can be used in a system such as an air conditioner.

The stainless steel constituting the pipe is composed of, percent by weight, C: 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: 0.03% or less, P: 0.04% or less, S: 0.04% or less, N: 0.03% or less, residue: Fe, and incidental impurities.

The matrix structure of the stainless steel constituting the pipe includes austenite. The matrix structure of the stainless steel preferably includes only austenite. The matrix structure of the stainless steel may include austenite and δ-ferrite. In this case, austenite is to occupy most of the matrix structure based on the grain size area of the stainless steel. The stainless steel may have an austenite matrix structure of 99% or more based on the grain size area thereof, and have a δ-ferrite matrix structure of 1% or less based on the grain size area thereof.

The stainless steel constituting the pipe has an average diameter of 30 to 60 μm. An ASTM grain size number of the stainless steel corresponds to 5.0 to 7.0.

A stainless steel pipe may be manufactured through forming, welding, cutting, and drawing. A stainless steel bent pipe may be manufactured by applying bending stress to a stainless steel linear pipe manufactured through forming, welding, cutting, and drawing. The stainless steel pipe formed as described above includes a weld zone, heat affected zones (HAZs), and outer and inner circumferential surfaces.

The weld zone is formed along the length direction of the stainless steel pipe, and the HAZs are respectively formed at both sides of the weld zone along the length direction of the stainless steel pipe. The outer and inner circumferential surfaces are formed as smooth surfaces.

The stainless steel pipe may have grooves formed in at least one of the inner and outer circumferential surfaces. The groove forms resistance against bending stress applied to the stainless steel pipe, and generates turbulence of a refrigerant flowing in the stainless steel pipe. The leakage of a refrigerant gas is caused by a step of a junction surface between a flare-shaped surface and a socket surface.

An outer diameter of a stainless steel linear pipe is 19.05 mm or more, and a thickness of the stainless steel linear pipe is 0.5 to 1.0 mm.

An outer diameter of a stainless steel bent pipe is 15.88 to 19.05 mm, and a thickness of the stainless steel bent pipe is 0.6 to 1.0 mm.

An outer diameter of a stainless steel bent pipe is 12.7 to 15.88 mm, and a thickness of the stainless steel bent pipe is 0.6 to 0.8 mm.

An outer diameter of a stainless steel bent pipe is 9.52 to 12.7 mm, and a thickness of the stainless steel bent pipe is 0.5 to 0.8 mm.

An outer diameter of a stainless steel bent pipe is 6.35 to 9.52 mm, and a thickness of the stainless steel bent pipe is 0.4 to 0.7 mm.

Advantageous Effects

A stainless steel according to an embodiment of the present invention can have properties of low strength and low hardness, as compared with a conventional stainless steel, through a composition including copper (Cu), a matrix structure configured with austenite, and/or an average diameter of 30 to 60 μm. The conventional stainless steel has the problem of processability due to its strength and hardness, which are excessively higher than those of copper. A bent pipe has been manufactured using a stainless steel according to an embodiment of the present invention.

Since a stainless steel according to an embodiment of the present invention has strength and hardness to substantially the same level as copper, sufficient processability can be ensured, and the stainless steel can be used to manufacture pipes (linear or bent pipes) used in a system such as an air conditioner. In particular, when a bent pipe is manufactured using the stainless steel, it is possible to address the problem that plastic deformation is not sufficiently made.

In addition, when a pipe is manufactured using a stainless steel according to an embodiment of the present invention, heat loss reduction and corrosion resistance performance can be ensured. The heat loss reduction and the corrosion resistance performance are intrinsic properties of stainless steel. Thus, although the stainless steel has low strength and low hardness as compared with a conventional stainless steel according to an embodiment of the present invention, the stainless steel maintains intrinsic properties of stainless steel.

In addition, an embodiment of the present invention provides a method for manufacturing a pipe using a stainless steel. In particular, outer and inner circumferential surfaces of the stainless steel pipe can be respectively formed as smooth surfaces through cutting and drawing processes. Even when the stainless steel pipe of which outer and inner circumferential surfaces are formed as smooth surfaces is processed for enlargement to be coupled to another pipe, a rupture may not occur in the stainless steel pipe.

A pipe made of a stainless steel material according to an embodiment of the present invention can be formed thinner, with critical pressure and critical bending moment similar to those of a conventional copper pipe. Thus, a desired stainless pipe can be manufactured with a reduced thickness according to an embodiment of the present invention.

MODE FOR CARRYING OUT THE INVENTION

Figure 1:
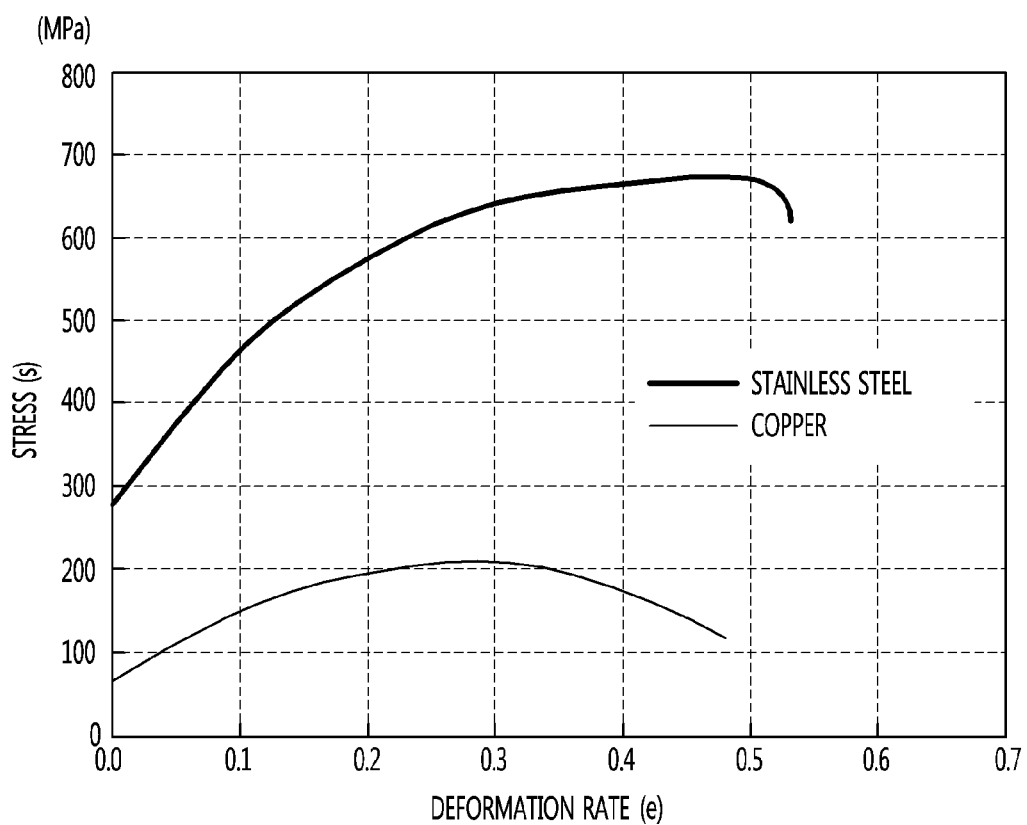
FIG. 1 is a stress-deformation rate graph obtained by comparing properties of stainless steel and copper.

Hereinafter, exemplary embodiments of the present invention will be described in detail with reference to the accompanying drawings. Even though embodiments are different from each other in this specification, the same or similar components are denoted by the same or similar reference numerals and the description thereof is replaced with the first description. As used herein, the singular forms are intended to include the plural forms as well, unless the context clearly indicates otherwise A stainless steel according to an embodiment of the present invention shows properties of low strength and low hardness as compared with a conventional stainless steel. The stainless steel according to an embodiment of the present invention has strength and hardness to substantially the same level as those of copper. The properties of low strength and low hardness of the stainless steel can be confirmed by measuring yield strength, tensile strength, hardness, and elongation of the stainless steel, and by comparing them with those of copper, etc. If the stainless steel has properties of strength and hardness to substantially the same level as those of copper, the problem of processability in the conventional stainless steel can be addressed.

The properties of low strength and low hardness of the stainless steel are achieved by controlling the composition, matrix structure, and/or average diameter of the stainless steel. Hereinafter, factors that determine the properties of low strength and low hardness of the stainless steel will be described. Hereinafter, each content is designated by weight percent (wt %) as long as it is not particularly indicated.

1. Composition of Stainless Steel (1) Carbon (C): 0.03% or less

The stainless steel according to an embodiment of the present invention includes carbon (C) and chromium (Cr). The carbon is precipitated as chromium carbide by reacting with the chromium. In this case, the chromium is exhausted at a grain boundary or surroundings thereof, which becomes a cause of corrosion. Therefore, the content of carbon is preferably maintained small. If the content of carbon exceeds 0.03%, it may be difficult to provide the stainless steel with strength and hardness to substantially the same level as those of copper, and it may also be difficult to ensure sufficient processability by using properties of low strength and low hardness. Thus, the content of carbon is beneficially set to 0.03% or less such that the stainless steel has low strength and low hardness to substantially the same level as those of copper, and accordingly, sufficient processability can be ensured.

(2) Silicon (Si): Exceeding 0 to 1.7% or Less

Austenite has a low yield strength as compared with ferrite or martensite. Therefore, the matrix structure of the stainless steel beneficially has a higher amount of austenite such that the stainless steel has the properties of low strength and low hardness to substantially the same level as those of copper.

However, silicon is an element that forms ferrite. As the content of silicon increases, the ratio of ferrite in the matrix structure is increased, and the stability of ferrite is also increased. Therefore, the content of silicon is preferably maintained small. If the content of silicon exceeds 1.7%, it may be difficult to provide the stainless steel with strength and hardness to substantially the same level as those of copper, and it may be difficult to ensure sufficient processability. Thus, the content of silicon is beneficially set to 1.7% or less such that the stainless steel has low strength and low hardness to substantially the same level as those of copper, and accordingly, sufficient processability can be ensured.

(3) Manganese (Mn): 1.5 to 3.5%

Manganese is an element that reduces or prevents the matrix structure of the stainless steel from being phase-transformed into martensite. If the content of manganese is less than 1.5%, the effect that the phase transformation is prevented by manganese may not sufficiently occur. Thus, the lower bound of the content of manganese is beneficially set to 1.5% so as to sufficiently reduce or prevent the formation of martensite.

However, as the content of manganese increases, the yield strength of the stainless steel is increased, and therefore, the stainless steel may not have a property of low strength to substantially the same level as that of copper. Thus, the higher bound of the content of manganese is beneficially set to 3.5% such that the stainless steel has the property of low strength.

(4) Chromium (Cr): 15.0 to 18.0%

Chromium is an element that improves corrosion initiation resistance of the stainless steel. Corrosion initiation means that corrosion first occurs in a base material in a state in which no corrosion exists in the base material, and the corrosion initiation resistance means a property that prevents corrosion from first occurring in the base material. If the content of chromium is lower than 15.0%, the stainless steel may not have sufficient corrosion initiation resistance. Thus, the lower bound of the content of chromium is beneficially set to 15.0% such that the stainless steel has sufficient corrosion initiation resistance.

However, if the content of chromium is excessively high, the strength of the stainless steel is increased, but the elongation of the stainless steel is decreased. If the content of chromium exceeds 18.0%, the increment of the strength of the stainless steel and the decrement of the elongation of the stainless steel are increased, and therefore, it may be difficult to ensure sufficient processability of the stainless steel. Thus, the higher bound of the content of chromium is beneficially set to 18.0% such that the stainless steel has sufficient processability.

Further, since chromium is an expensive material, the content of chromium has influence on the economic feasibility of the stainless steel. Thus, the content of chromium is beneficially set to the above-described range such that the economic feasibility of the stainless steel can be ensured.

(5) Nickel (Ni): 7.0 to 9.0%

Nickel is an element that improves corrosion growth resistance. Corrosion growth means that corrosion already occurred in a base material grows while being spread into a wide range, and the corrosion growth resistance means a property that reduces or prevents the growth of corrosion. The corrosion growth resistance is conceptually different from the corrosion initiation resistance. If the content of nickel is lower than 7.0%, the stainless steel may not have sufficient corrosion growth resistance. Thus, the lowest limit of the content of nickel is beneficially set to 7.0% such that the stainless steel has sufficient corrosion growth resistance.

However, if the content of nickel is excessively high, the strength and hardness of the stainless steel are increased. If the content of nickel exceeds 9.0%, the increment of the strength of the stainless steel and the increment of the hardness of the stainless steel are increased, and therefore, it may be difficult to ensure sufficient processability of the stainless steel. Thus, the higher bound of the content of nickel is beneficially set to 9.0% such that the stainless steel can ensure sufficient processability.

Further, since nickel is an expensive material, the content of nickel has influence on the economic feasibility of the stainless steel. Thus, the content of nickel is beneficially set to the above-described range such that the economic feasibility of the stainless steel can be ensured.

(6) Copper (Cu): 1.0 to 4.0%

Copper is an element that reduces or prevents the matrix structure of the stainless steel from being phase-transformed into martensite. If the content of copper is less than 1.0%, the effect that the phase transformation is prevented by copper may not sufficiently occur. Thus, the lower bound of the content of copper is beneficially set to 1.0% so as to sufficiently reduce or prevent the formation of martensite. In particular, the content of copper is beneficially managed to 1.0% or more such that the stainless steel has properties of low strength and low hardness to substantially the same level as those of copper. As the stainless steel includes copper having a content of 1.0% or more, the stainless steel may be classified into a Cu-based stainless steel.

As the content of copper increases, the phase transformation effect of the copper is increased, but the increment of the phase transformation effect is gradually decreased. If the content of copper exceeds 4.0%, the effect that the phase transformation is prevented by the copper is saturated. Since copper is an expensive material, the content of copper has influence on the economic feasibility of the stainless steel. Thus, the higher bound of the content of copper is beneficially set to 4.0% such that the economic feasibility of the stainless steel can be ensured within a range in which the effect that the phase transformation is prevented by the copper is saturated.

(7) Molybdenum (Mo): 0.03% or less
(8) Phosphorus (P): 0.04% or less
(9) Sulfur (S): 0.04% or less
(10) Nitrogen (N): 0.03% or less Molybdenum, phosphorus, sulfur, and nitrogen are elements that are originally included in steel semi-finished products, and harden the stainless steel. Therefore, each of the molybdenum, the phosphorus, the sulfur, and the nitrogen is preferably maintained to have a content as low as possible. The molybdenum may improve corrosion resistance of the stainless steel, but further hardens the stainless steel, as compared with when the molybdenum improves the corrosion resistance of the stainless steel. Hence, the content of molybdenum is beneficially managed to 0.03% or less. The phosphorus, the sulfur, and the nitrogen are beneficially set to 0.04% or less, 0.04% or less, and 0.03% or less, respectively, so as to reduce or prevent the stainless steel from being hardened.

2. Matrix Structure of Stainless Steel

A matrix structure of stainless steel may be determined based on its composition and/or heat treatment condition. Typically, a matrix structure of stainless steel is divided into austenite, ferrite, and martensite. Properties of stainless steel change depending on the matrix structure of austenite, ferrite, and martensite.

The stainless steel according to an embodiment of the present invention has a matrix structure including austenite. The austenite phase leads to a matrix structure that exhibits properties of low yield strength and low hardness as compared with ferrite or martensite. Further, an average diameter, which will be described later, is a limitation that is controlled by growing the crystal size of the stainless steel. When crystal sizes are grown by processing the three matrix structures under the same condition, the austenite-rich matrix can obtain the highest effect of low strength and low hardness.

The matrix structure of the stainless steel is preferably configured with only austenite. However, it may be difficult to obtain the stainless steel having the matrix structure comprised of only austenite, and hence the stainless steel may include not only the matrix structure of austenite but also another matrix structure. In order to obtain properties of low strength and low hardness, the stainless steel is to have the matrix structure of austenite, which is 90% or more, preferably, 99% or more, based on the grain size area thereof. For example, when the stainless steel includes the matrix structure of austenite and the matrix structure of δ-ferrite, the stainless steel is to have the matrix structure of austenite, which is 99% or more, and the matrix structure of δ-ferrite, which is 1% or less, based on the grain size area thereof.

The properties of the stainless steel change depending on the matrix structure of the stainless steel. Embodiment 1 and Embodiment 2 are set and compared with each other so as to evaluate the properties of the stainless steel depending on the matrix structure of the stainless steel.

Figure 2A:
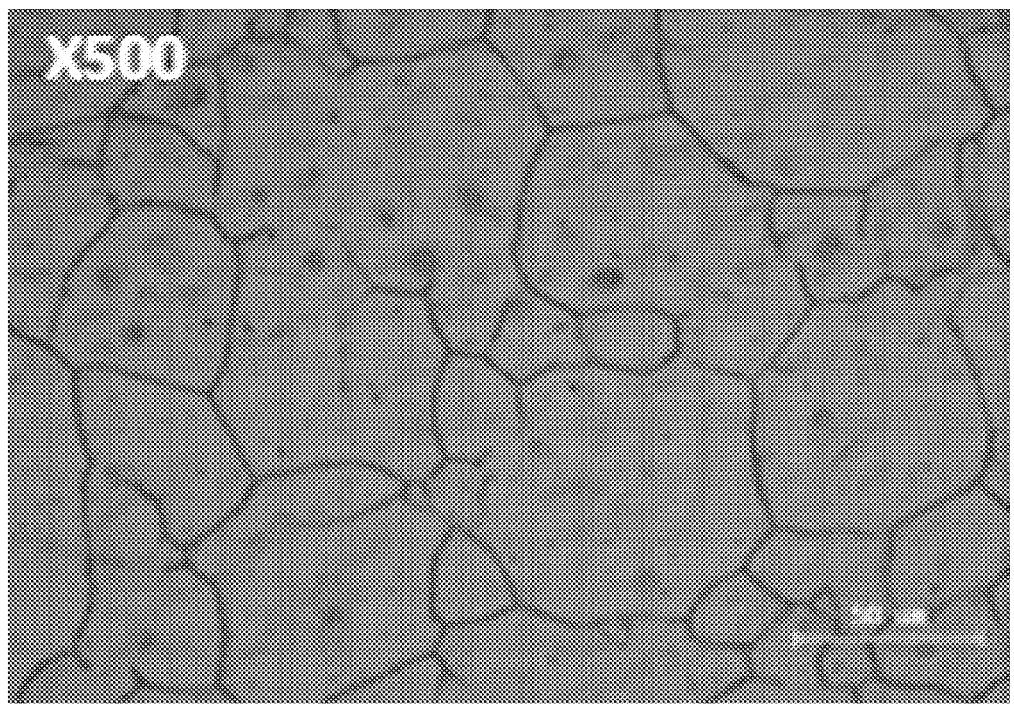
FIG. 2A is a microstructure photograph showing a stainless steel according to Embodiment 1 of the present invention.
Figure 2B:
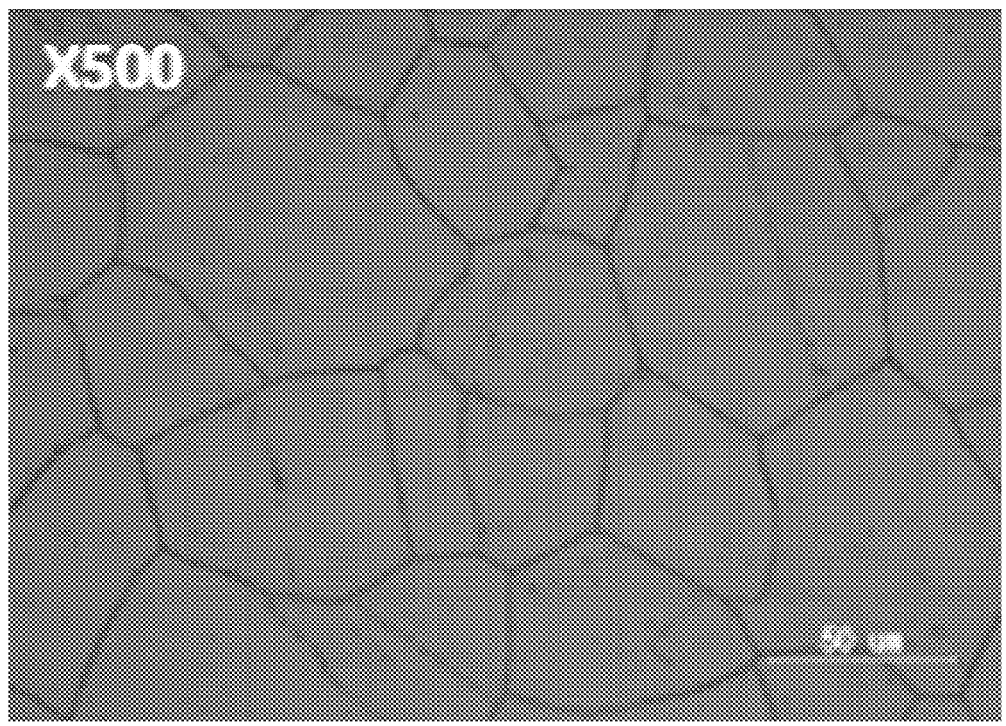
FIG. 2B is a microstructure photograph showing a stainless steel according to Embodiment 2 of the present invention.

FIG. 2A is a photograph showing a microstructure of stainless steel according to Embodiment 1 of the present invention. FIG. 2B is a photograph showing a microstructure of stainless steel according to Embodiment 2 of the present invention.

The stainless steels of Embodiments 1 and 2 have the same composition within the range described in [1. Composition of Stainless Steel]. Also, the stainless steels of Embodiments 1 and 2 have average diameters corresponding to a grain size number of 5.0 to 7.0 which will be described in [3. Average Diameter of Stainless Steel]. However, while the stainless steel of Embodiment 1 has the matrix structure of austenite, which is 99% or more, and the matrix structure of ferrite, which is 1% or less, based on the grain size area thereof, the stainless steel of Embodiment 2 has only the matrix structure of austenite.

Results obtained by comparing the stainless steels of Embodiments 1 and 2 with each other are shown in the following Table 1.

TABLE 1

| | | Mechanical properties | | | |
| --- | --- | --- | --- | --- | --- |
| | Kinds | Yield strength [MPa] | Tensile strength [MPa] | Hardness [Hv] | Elongation [%] |
| Embodiment 1 | Stainless steel (austenite + δ-ferrite]) | 180 | 500 | 120 | 52 |
| Embodiment 2 | Stainless steel (austenite) | 160 | 480 | 110 | 60 |

From Table 1, it can be seen that the stainless of Embodiment 2 has properties of low strength and low hardness as compared with the stainless steel of Embodiment 1. In addition, the stainless steel of Embodiment 2 has a high elongation as compared with the stainless steel of Embodiment 1. Therefore, the stainless steel is preferably configured with only the matrix structure of austenite to obtain low strength and low hardness. As the ratio of the matrix structure of δ-ferrite increases, the strength and hardness of the stainless steel are increased. Therefore, although the stainless steel has the matrix structure of δ-ferrite, the ratio of the matrix structure of the δ-ferrite is to be 1% or less, based on the grain size area of the stainless steel.

Even when the stainless steel has the matrix structure of δ-ferrite, which is 1% or less, it may be advantageous in implementation of low strength and low hardness by having δ-ferrite not uniformly distributed in all crystal grains but locally gathered (concentrated) and distributed in a specific crystal grain.

3. Average Diameter of Stainless Steel

An average diameter of stainless steel may be determined based on its composition and/or heat treatment condition. The average diameter of stainless steel has influence on the strength and hardness of stainless steel. For example, as the average diameter of stainless steel decreases, the strength and hardness of stainless steel increases. As the average diameter of stainless steel increases, the strength and hardness of stainless steel decreases.

An average diameter of the stainless steel is beneficially set to 30 to 60 μm so as to ensure the properties of low strength and low hardness of the stainless steel according to an embodiment of the present invention. In general, the average diameter of austenite is smaller than 30 μm. Therefore, the average diameter is to be grown to 30 μm or more through a manufacturing process and heat treatment. According to the standard of American Society for Testing and Materials (ASTM), the average diameter of 30 to 60 μm corresponds to a grain size number of 5.0 to 7.0. On the other hand, the average diameter smaller than 30 μm corresponds to an ASTM grain size number of 7.5 or more.

If the average diameter of the stainless steel is smaller than 30 μm or if the grain size number of the stainless steel is greater than 7.0, the stainless steel may not have the properties of low strength and low hardness. In particular, the average diameter (or grain size number) of the stainless steel is a factor that determines the properties of low strength and low hardness of the stainless steel.

Properties of the stainless steel change depending on the average diameter of the stainless steel. Embodiments and Comparative Examples are set and compared with each other so as to evaluate the properties of the stainless steel depending on the average diameter of the stainless steel.

Comparative Example 1 is copper, Comparative Examples 2 to 5 are stainless steels having grain size numbers of 7.5 or more, and Embodiment 3 of the present invention is a stainless steel having a grain size number of 6.5.

Figure 3:
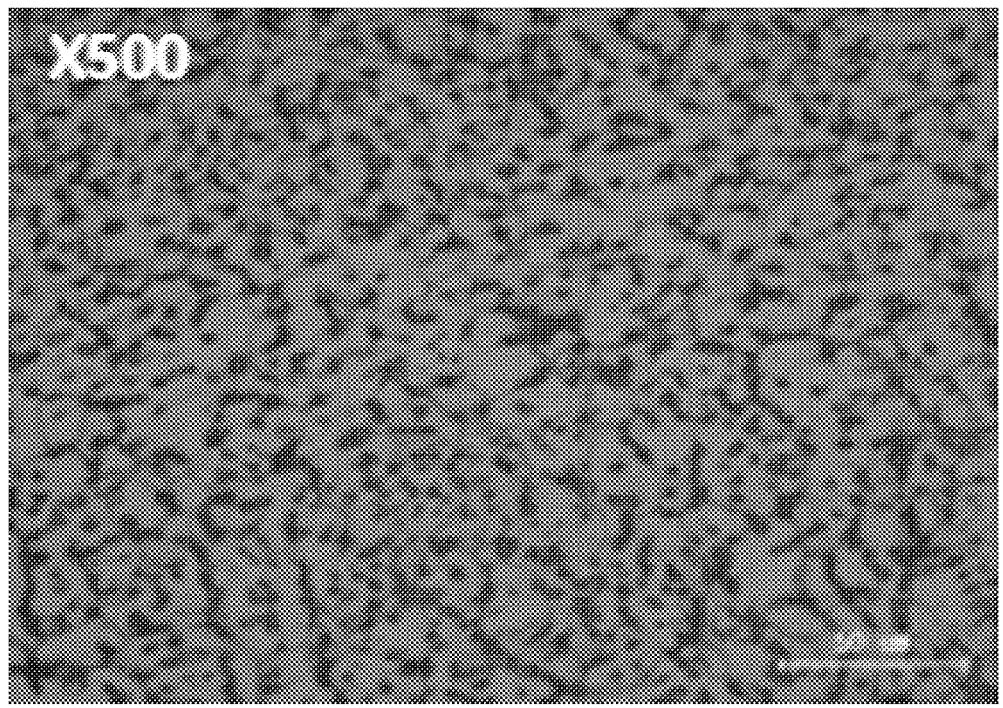
FIGS. 3 to 6 are microstructure photographs showing stainless steels according to Comparative Examples 2 to 5.

FIG. 3 is a photograph showing a microstructure of the stainless steel according to Comparative Example 2. The stainless steel of Comparative Example 2 has the matrix structure of austenite, which is 99% or more, and the matrix structure of the δ-ferrite, which is 1% or less, based on the grain size area thereof. The stainless steel of Comparative Example 2 has an average diameter of about 15 to 17 μm corresponding to an ASTM grain size number of 9.

Figure 4:
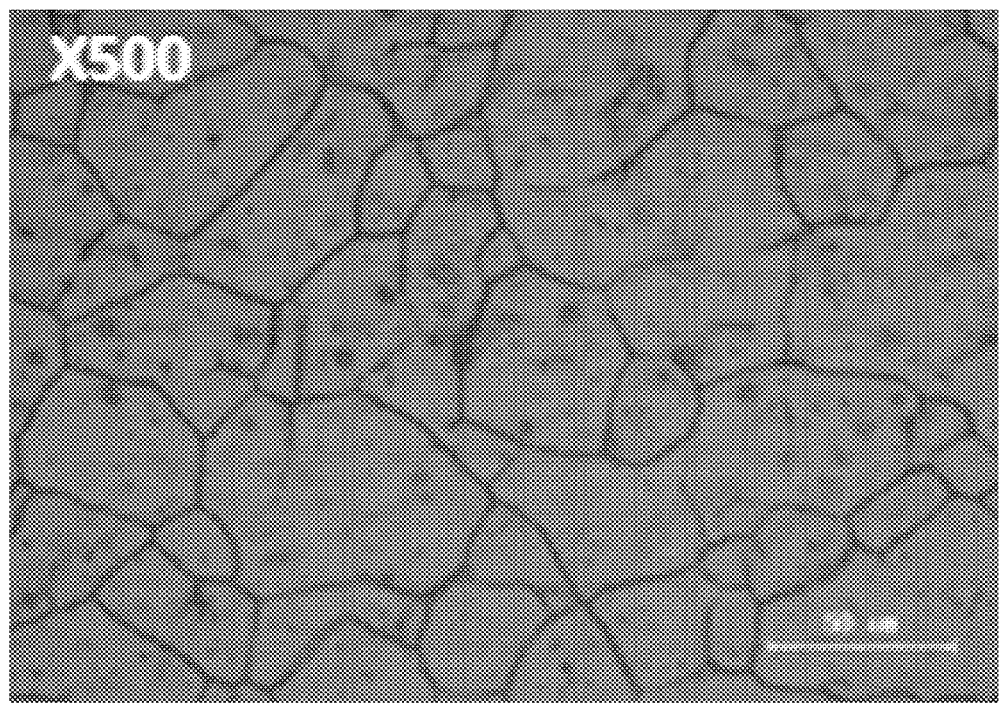

FIG. 4 is a photograph showing a microstructure of the stainless steel according to Comparative Example 3. The stainless steel of Comparative Example 3 has the matrix structure of austenite, which is 99% or more, and the matrix structure of δ-ferrite, which is 1% or less, based on the grain size area thereof. The stainless steel of Comparative Example 3 has an average diameter of about 24 to 27 μm corresponding to an ASTM grain size number of 7.5.

Figure 5:
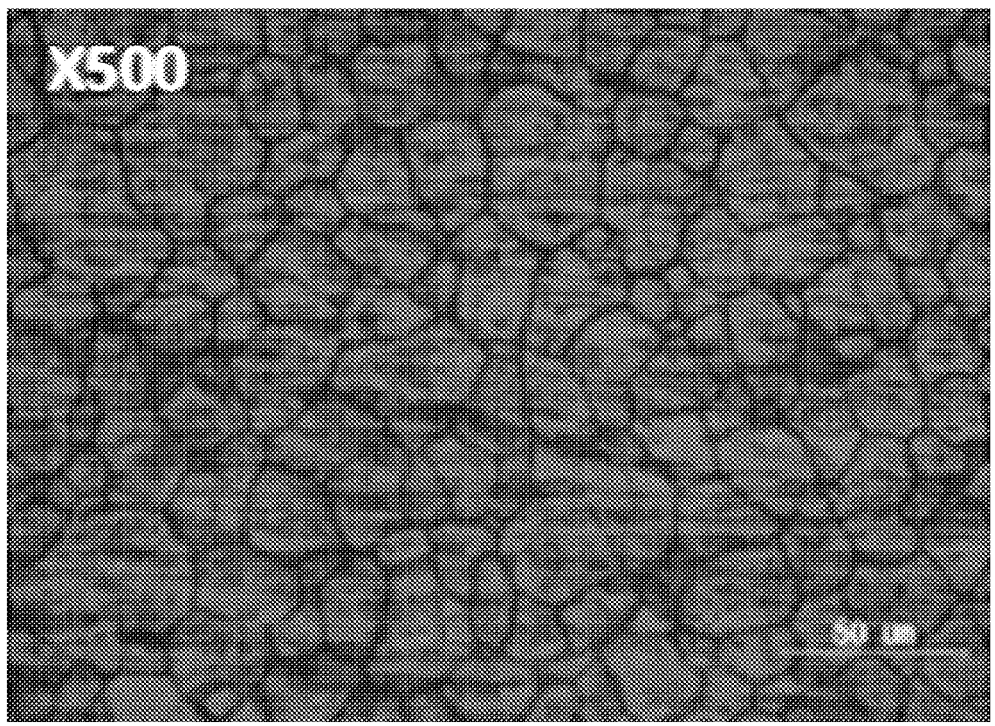

FIG. 5 is a photograph showing a microstructure of the stainless steel according to Comparative Example 4. The stainless steel according to Comparative Example 4 has only the matrix structure of austenite, and has an average diameter corresponding to the ASTM grain size number of 9.

Figure 6:
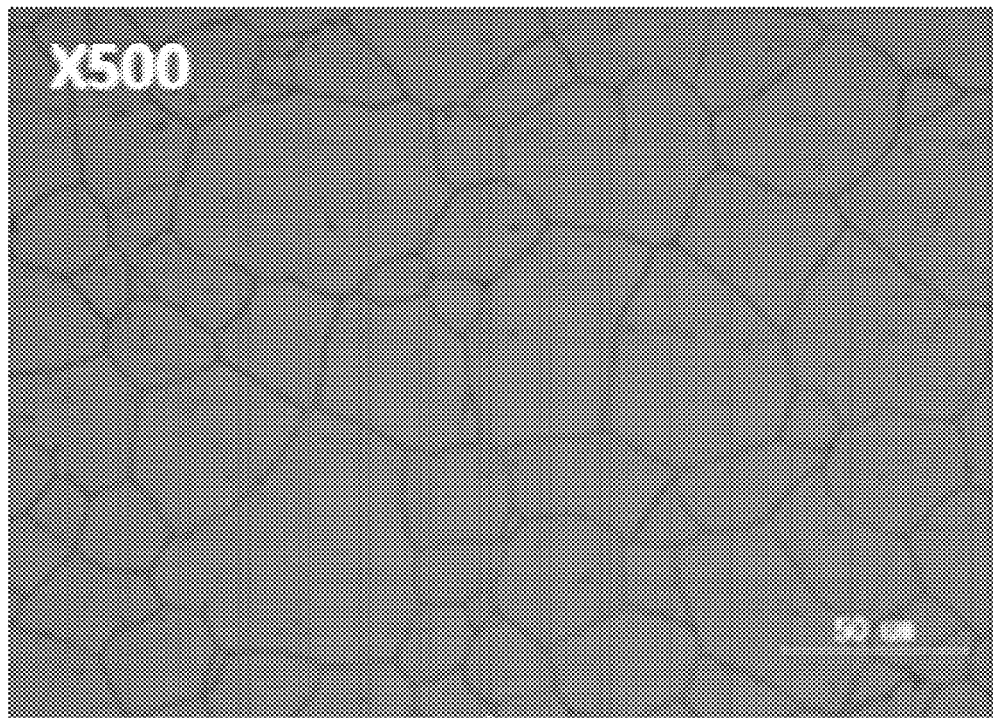

FIG. 6 is a photograph showing a microstructure of the stainless steel according to Comparative Example 5. The stainless steel of Comparative Example 5 has only the matrix structure of austenite, and has an average diameter corresponding to the ASTM grain size number of 7.5.

The stainless steel of Embodiment 3 has an average diameter of about 39 to 40 μm corresponding to the ASTM grain size number of 6.5. The microstructure of the stainless steel according to Embodiment 3 is predicted to be substantially identical or similar to that of Embodiment 1 or Embodiment 2 shown in FIG. 2A or 2B (e.g., when the ASTM grain size number of Embodiment 1 or 2 is 6.5).

Figure 7:
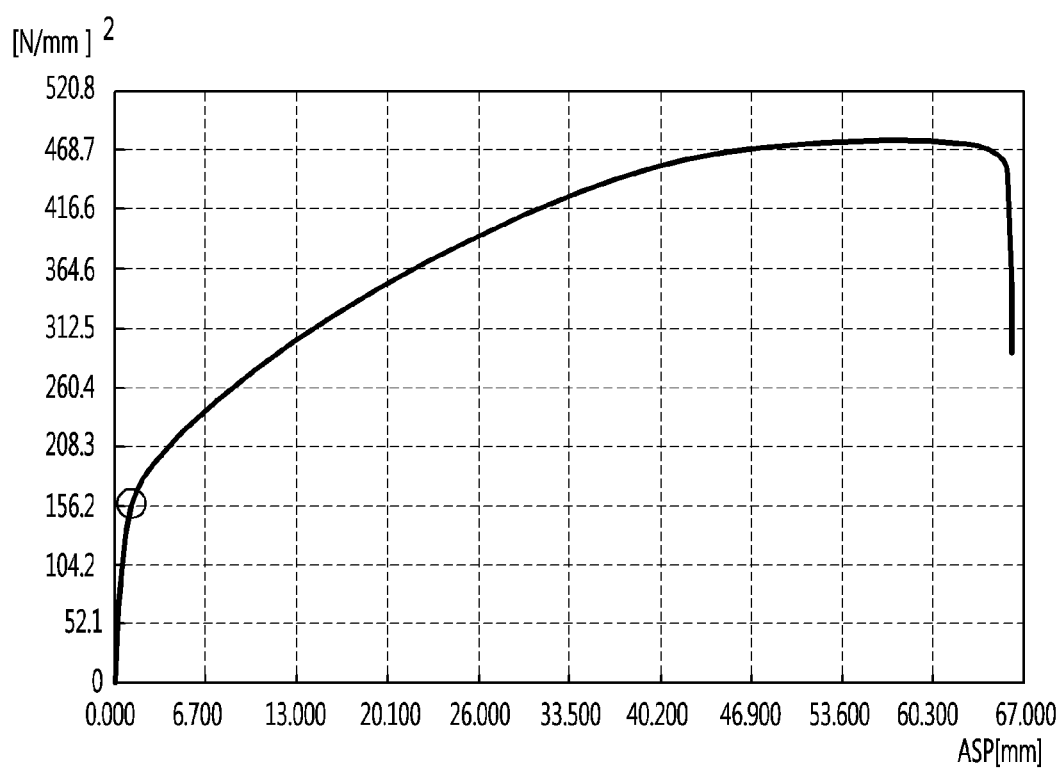
FIG. 7 is a stress-deformation rate graph obtained by evaluating properties of a stainless steel according to Embodiment 3 of the present invention.

FIG. 7 is a stress-deformation rate graph obtained by evaluating properties of the stainless steel according to Embodiment 3. The horizontal axis of the graph represents displacement (mm) of the stainless steel, and the vertical axis of the graph represents stress (N/mm2) applied to the stainless steel.

As can be seen from the graph, the yield strength of the stainless steel was measured to be about 156.2 MPa, and the tensile strength of the stainless steel was measured to be about 470 MPa.

Based on the test results by evaluating properties of the stainless steel, although the composition, matrix structure, and average diameter were gradually changed from Embodiment 3, the stainless steel had a yield strength of about 160 MPa or less, a tensile strength of about 480 MPa or less, a hardness of about 120 Hv or less, and an elongation of 60% or more. In addition, the stainless steel had properties within the above-described range, regardless of the shape of the stainless steel, which was a tube or sheet.

The test results obtained by comparing the stainless steels according to an embodiment of the present invention with other Comparative Examples are shown in the following Table 2.

TABLE 2

| Kinds | | Mechanical | | | |
|---|---|---|---|---|---|
| | | Yield strength [MPa] | Tensile strength [MPa] | Hardness [Hv] | Elongation [%] |
| Comparative Example 1 | Copper (C1220T) pipe | 100 | 270 | 100 | 45 or more |
| Comparative Examples 2 to 5 | Stainless steel (grain size number: 7.5 or more) | 200 or so | 500 or so | 130 or so | 50 or more |
| Embodiment of Present invention | Stainless steel (grain size number: 5.0 to 7.0) | 160 or so | 480 or so | 120 or so | 60 or more |

Comparative Example 1 is a copper pipe, which has a yield strength of 100 MPa, a tensile strength of 270 MPa, a hardness of 100 Hv, and an elongation of 45% or more. Since copper has properties of low strength and low hardness, copper pipes are commercialized as a refrigerant pipe in an air conditioner, etc. However, as described above, the reliability of copper is limited due to corrosion, and thus, the copper pipe may be inappropriate to be used as a pipe for a new refrigerant.

In addition, the stainless steels of Comparative Example 2 to 5 have compositions and matrix structures, which are similar to those of the stainless steel according to an embodiment of the present invention, and grain size numbers of the stainless steels are 7.5 or more. The stainless steels of Comparative Examples 2 to 5 have yield strengths of 200 MPa or so, tensile strengths of 500 MPa or so, hardnesses of 130 Hv or so, and elongations of 50% or more. The stainless steels of Comparative Examples 2 to 5, which have grain size numbers greater than 7.5, have properties of excessively high strength and excessively high hardness as compared with the copper. Therefore, although the stainless steels of Comparative Examples 2 to 5 can address the corrosion problem of copper, the stainless steels of Comparative Examples 2 to 5 may be inappropriate to be processed as a refrigerant pipe.

On the other hand, the stainless steel according to an embodiment of the present invention has a yield strength of about 160 MPa or so, a tensile strength of about 480 MPa or so, a hardness of about 120 Hv or so, and an elongation of 60% or more. Thus, the stainless steel according to an embodiment of the present invention can address not only the problem of processability, which may occur in the stainless steels of Comparative Examples 2 to 5, but also the problem of corrosion, which may occur in the copper of Comparative Example 1. Further, since the stainless steel according to an embodiment of the present invention has a property of sufficiently high pressure resistance, it can be used as a pipe for a new high-pressure refrigerant such as R32.

In addition, the thermal conductivity of copper is 388 W/mK, and the thermal conductivity of stainless steel is 16.2 W/mK. Since heat loss in the flow of a refrigerant increases as the thermal conductivity of a material increases, the efficiency of a cycle deteriorates as the thermal conductivity of the material increases. The thermal conductivity of stainless steel is merely about 4% of copper. Thus, if a piper for the cycle is configured with stainless steel, heat loss can be reduced, thereby improving the efficiency of the cycle.

As described above, the stainless steel according to an embodiment of the present invention has properties of low strength and low hardness to substantially the same level as those of a copper material, while having properties of high corrosion resistance and high pressure resistance, which are intrinsic properties of stainless steel. Thus, the stainless steel according to an embodiment of the present invention has sufficient conditions applicable to a pipe by addressing the problem of processability.

Hereinafter, a pipe made of stainless steel, a system including the pipe, and the like will be described.

Figure 8:
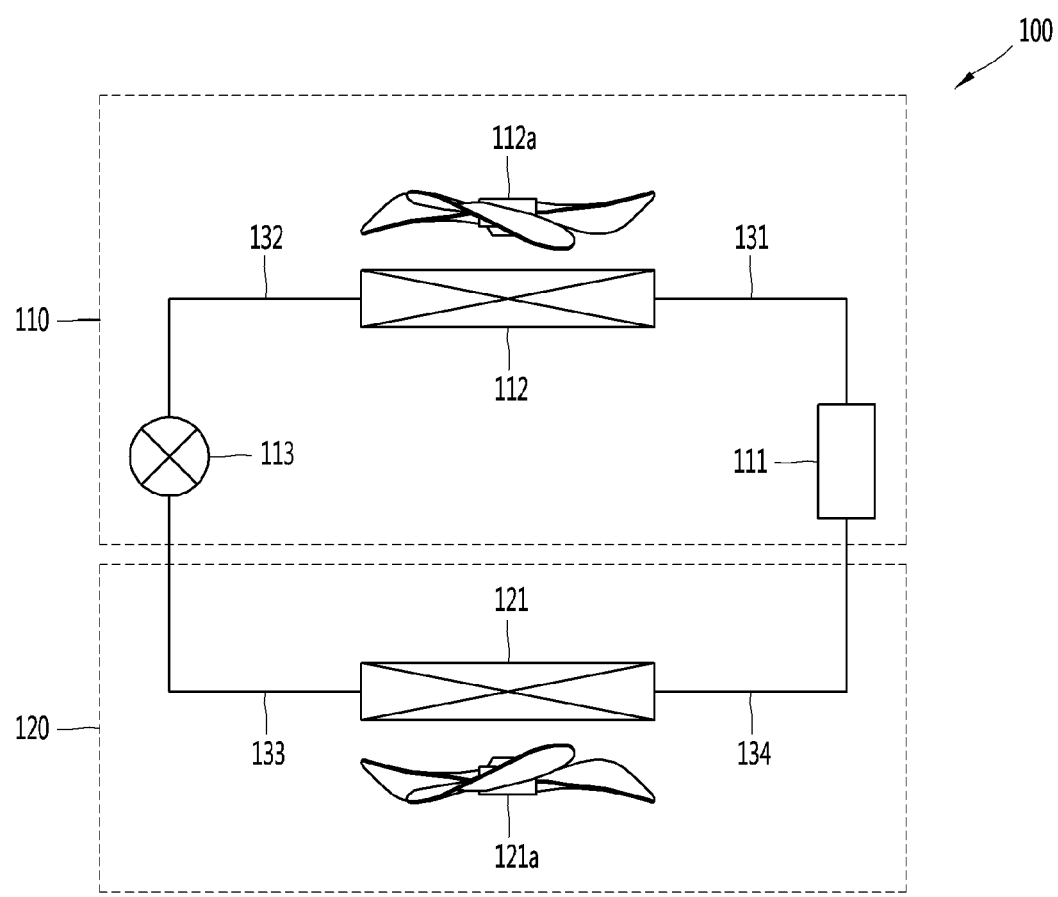
FIG. 8 is a main portion configuration view of an air conditioner.

FIG. 8 is a main portion configuration view of an air conditioner 100.

The air conditioner 100 is an exemplary system including pipes 131, 132, 133, and 134 that are made of stainless steel. Therefore, the system including the stainless pipes 131, 132, 133, and 134 is not necessarily limited to the air conditioner 100, and other types of system can include the stainless steel pipes 131, 132, 133, and 134 according to an embodiment of the present invention.

The air conditioner 100 includes an outdoor unit 110 and an indoor unit 120. One or more indoor units 120 may be connected to one outdoor unit 110, and the outdoor unit 110 and the indoor unit(s) 120, which are connected as described above, may be operated as one system. In addition, the air conditioner 100 may be operated in a cooling mode or a heating mode by selectively operating the refrigeration cycle in only one direction. Alternatively, the air conditioner 100 may be alternately operated in the cooling mode and the heating mode by selectively operating the refrigeration cycle in both directions through a four-way valve (not shown).

The outdoor unit 110 may be configured to include a compressor 111, an outdoor heat exchanger 112, and an expander 113.

The compressor 111 is configured to compress a refrigerant to a high-temperature and high-pressure gas.

The outdoor heat exchanger 112 is configured to condense a gaseous refrigerant compressed to high temperature and high pressure in the compressor 111 to a high-pressure liquid by allowing the gaseous refrigerant to be heat-exchanged with outdoor air in a cooling operation. In addition, an outdoor fan 112a that allows heat exchange to be smoothly performed in the outdoor heat exchanger 112 is installed at one side of the outdoor heat exchanger 112. The outdoor fan 112a is formed to suck outdoor air and blow the sucked air toward the outdoor heat exchanger 112.

The expander 113 is configured to control an overheating degree in a cooling operation and an overcooling degree in a heating operation by adjusting the temperature of a refrigerant discharged from the outdoor heat exchanger 112.

In addition, the indoor unit 120 may be configured to include an indoor heat exchanger 121 and an indoor fan 121a. The indoor heat exchanger 121 is configured to convert a low-temperature and low-pressure refrigerant passing through the expander 131 into a low-temperature and low-pressure gas by evaporating the low-temperature and low-pressure refrigerant in the cooling operation. The indoor fan 121a circulates indoor air such that heat exchange is smoothly performed in the indoor heat exchanger.

The compressor 111, the outdoor heat exchanger 112, the expander 113, and the indoor heat exchanger 121 are sequentially connected by the pipes 131, 132, 133, and 134. The compressor 111, the outdoor heat exchanger 112, the expander 113, and the indoor heat exchanger 121, which are sequentially connected by the pipes 131, 132, 133, and 134, form the refrigeration cycle. Since a refrigerant flows along the pipes 131, 132, 133, and 134, the pipes 131, 132, 133, and 134 form a flow path of the refrigerant. In addition, since heat exchange is performed in the outdoor heat exchanger 112 and the indoor heat exchanger 121 while the refrigerant is flowing along the flow path, the outdoor heat exchanger 112 and the indoor heat exchanger 121 also form a flow path of the refrigerant. The above-described stainless steel according to an embodiment of the present invention is applicable as a material of the pipes 131, 132, 133, and 134, and is also applicable as a flow path of the outdoor heat exchanger 112 or the indoor heat exchanger 121.

Hereinafter, a pipe and a heat exchanger, to which the stainless steel according to an embodiment of the present invention is applicable, will be described.

Figure 9:
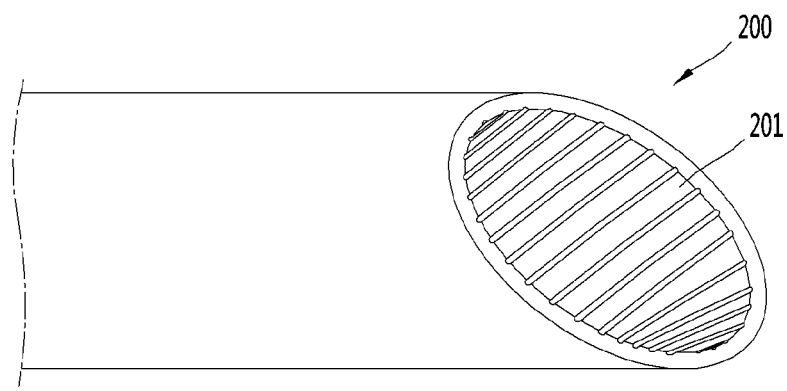
FIG. 9 is a conceptual view showing an example of a pipe applicable to the air conditioner of FIG. 8.

FIG. 9 is a conceptual view showing an example 200 of a pipe applicable to the air conditioner 100 of FIG. 8. The pipe 200 is made of stainless steel, and a groove 201 is formed in the inner circumferential surface of the pipe 200 shown in FIG. 9. The groove 201 may be formed in plurality, and the plurality of grooves 201 may be disposed along the length direction of the pipe 200 to be spaced apart from each other. A bead is to be removed from the inner circumferential surface of the pipe 200 such that the occurrence of rupture is reduced or prevented. The occurrence of rupture, which is related to the bead, will be described later.

Figure 10:
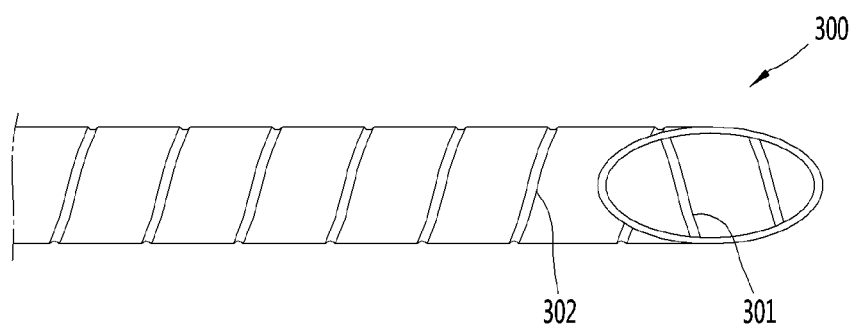
FIG. 10 is a conceptual view showing another example of the pipe applicable to the air conditioner of FIG. 8.

FIG. 10 is a conceptual view showing another example 300 of the pipe applicable to the air conditioner 100 of FIG. 8. The pipe 300 is made of a stainless steel, and grooves 301 and 302 are formed in the inner circumferential surface and outer circumferential surface of the pipe 200 shown in FIG. 10, respectively. Each of the grooves 301 and 302 may be formed in plurality, and the plurality of grooves 301 or 302 may be disposed along the length direction of the pipe 300 to be spaced apart from each other. A bead is to be removed from the inner circumferential surface of the pipe 300 such that the occurrence of rupture is reduced or prevented.

At least one groove 201, 301, or 302 is provided in at least one of the inner circumferential surface and the outer circumferential surface of the pipe 200 or 300 shown in FIG. 9 or 10 so as to allow a refrigerant to smoothly flow and constantly maintain the pressure of the refrigerant. A pipe in which the refrigerant flows may be configured as not only a linear pipe but also a bent pipe formed as at least a portion of the pipe is bent. The bent pipe is manufactured by plastically deforming the linear pipe 200 or 300 shown in FIG. 9 or 10. If distortion occurs at a bent portion to which plastic deformation is applied in the process of manufacturing the bent pipe, the flow of refrigerant may be interfered, and it may be difficult to constantly maintain the pressure of the refrigerant. This is because, when the internal diameter of the pipe is formed as uniform as possible, the refrigerant can smoothly flow, and the pressure of the refrigerant flowing in the pipe can be constantly maintained.

A protrusion part is naturally formed between the grooves. The protrusion part generates resistance against bending stress in the process of manufacturing the bent pipe, thereby reducing or preventing distortion of the pipe. Accordingly, the bent pipe manufactured by applying a bending stress to a linear pipe having grooves can have a relatively uniform internal diameter. Further, the refrigerant can smoothly flow in the bent pipe manufactured as described above, and the pressure of the refrigerant flowing in the bent pipe can be constantly maintained. The smooth flow of the refrigerant and the constant maintenance of the pressure of the refrigerant have influence on the efficiency of the refrigeration cycle and the performance of the air conditioner.

In particular, since the stainless steel according to an embodiment of the present invention has properties of low strength and low hardness, a bent pipe can be manufactured by applying a bending stress to a linear pipe. Since a conventional stainless steel has properties of excessively high strength and excessively high hardness as compared with copper, the conventional stainless steel is not sufficiently plastically deformed even when the bending stress is applied to a linear pipe. For example, although the bending stress is applied to a linear pipe, the linear pipe is not plastically deformed according to a designed shape. In addition, the linear pipe may be returned to the shape before the bending stress is applied or is not sufficiently bent.

However, the stainless steel according to an embodiment of the present invention has properties low strength and low hardness, which are similar to those of the copper, through the composition, matrix structure, and average diameter, which are described above. Accordingly, when a bent pipe is manufactured using the stainless steel according to an embodiment of the present invention, a sufficient plastic deformation can be caused by applying a bending stress to a linear pipe, and the bent pipe can be manufactured according to a designed shape. Further, it is possible to reduce or prevent the occurrence of distortion through grooves formed in the pipe in the process of applying the bending stress.

Figure 11:
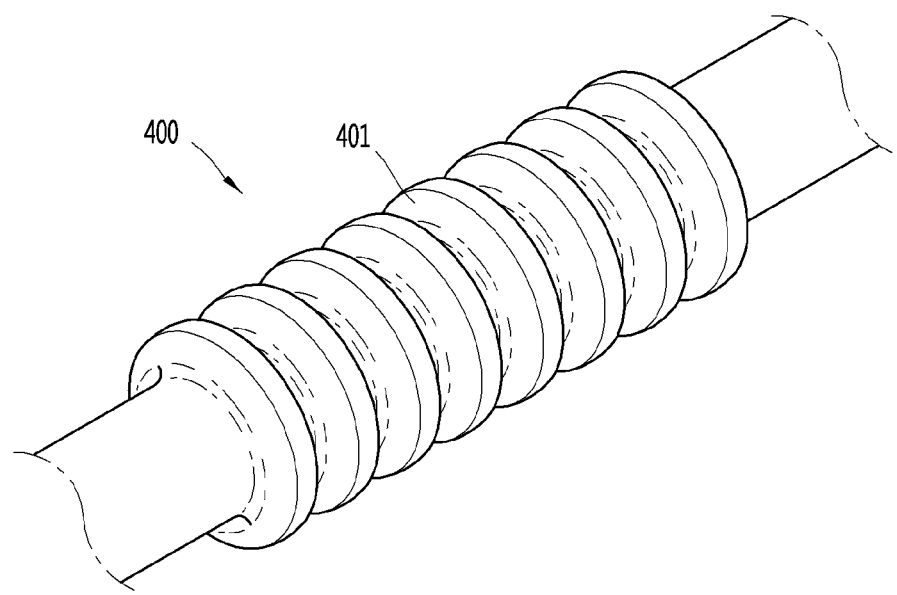
FIG. 11 is a conceptual view showing still another example of the pipe applicable to the air conditioner of FIG. 8.

FIG. 11 is a conceptual view showing still another example 400 of the pipe applicable to the air conditioner 100 of FIG. 8. The pipe 400 is made of the stainless steel. The pipe 400 shown in FIG. 11 is formed as a corrugated pipe having a corrugated part 401. The corrugated pipe may be bent based on the corrugated part 401.

The highest bending formability is typically desired at end portions of the pipes connected to the outdoor unit and the indoor unit of the air conditioner. Therefore, a bent pipe manufactured by simply applying a bending stress to a linear pipe may not satisfy workability and installation specifications desired at the end portions of the pipes connected to the outdoor unit and the indoor unit of the air conditioner.

Accordingly, the corrugated pipe having the corrugated part 401 may be formed at the pipes connected to the outdoor unit and the indoor unit within a range that satisfies a noise reference and a cooling/heating performance reference. The corrugated part 401 may be formed at a portion or the whole of the pipe 400. In the corrugated part 401, a noise may be generated due to the formation of turbulence. Therefore, the corrugated part 401 is to be formed within a range that satisfies the noise reference.

In particular, the pipe 400 having the corrugated part 401 is to satisfy a rupture pressure of 178 kgf/cm$^2$ according to Korean High Pressure Gas Safety Code and a rupture pressure of 214 kgf/cm$^2$ according to U.S. Underwriters Laboratories (UL) Standard. As an experimental result, a corrugated pipe ($\varphi$15.88, 0.6 t) made of the stainless steel according to an embodiment of the present invention has a rupture pressure of 251.3 kgf/cm$^2$, and thus satisfies all of the standards.

Figure 12:
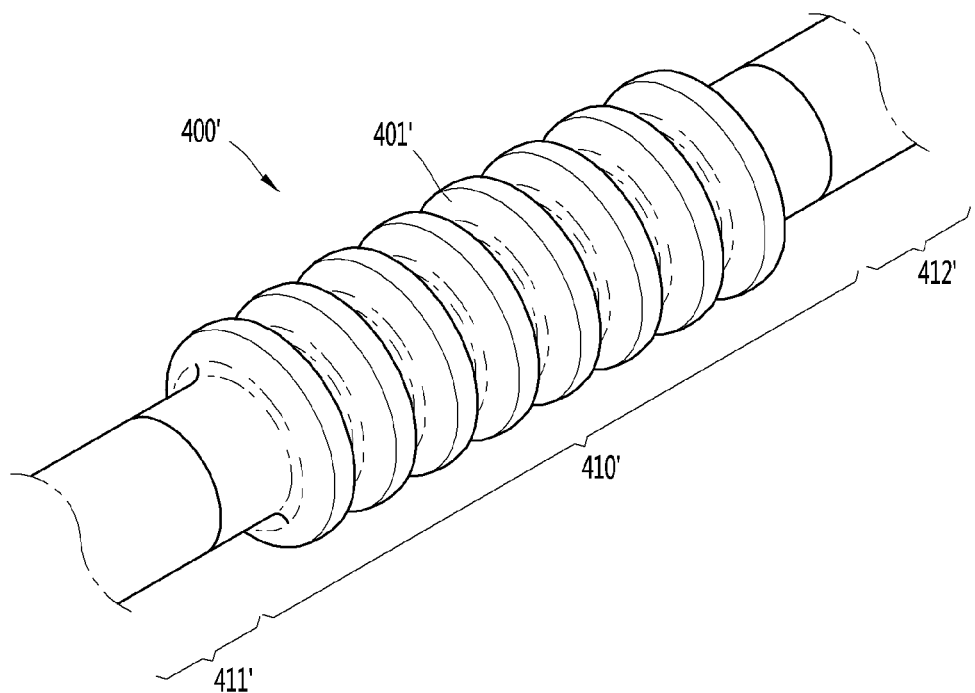
FIG. 12 is a conceptual view showing still another example of the pipe applicable to the air conditioner of FIG. 8.

FIG. 12 is a conceptual view showing still another example 400' of the pipe applicable to the air conditioner 100 of FIG. 8. A first part 410' of the pipe 400' is made of a stainless steel, and the other parts 411' and 412' of the pipe 400' are made of copper (Cu). The pipe 400' shown in FIG. 12 is formed as a corrugated pipe having a corrugated part 401'. The corrugated pipe may be bent based on the corrugated part 401'.

A second part 411' and a third part 412', which are made of copper, are respectively joined at both ends of the first part 410' made of the stainless steel such that the first part 410' can be easily joined with the corresponding copper part. Since the second part 411' and the third part 412' are made of copper and are in a seamless state, a bead may or may not be formed at an inner circumferential surface of the first part 410'. This is because rupture may not occur due to the bead.

The other contents described in FIG. 11 are applicable to FIG. 12.

Figure 13:
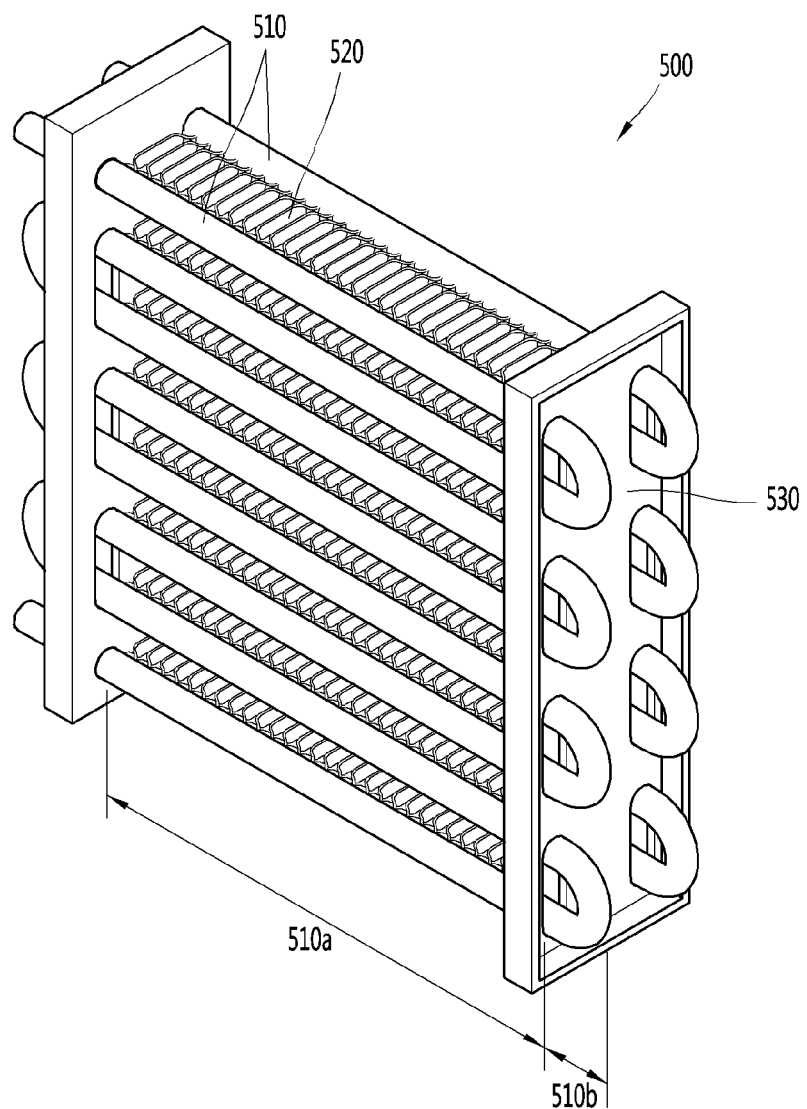
FIG. 13 is a conceptual view showing a fin-tube heat exchanger applicable to the air conditioner of FIG. 8.

FIG. 13 is a conceptual view showing a fin-tube heat exchanger 500 applicable to the air conditioner of FIG. 8.

The fin-tube heat exchanger 500 includes a pipe 510, cooling fins 520, and pipe supporting platforms 530.

The pipe 510 forms a flow path of the refrigerant. When the fin-tube heat exchanger 500 is applied as the outdoor heat exchanger, one end of the pipe 510 is connected to an exit of the compressor, and the other end of the pipe 510 is connected to an entrance of the expander. When the fin-tube heat exchanger 500 is applied as the indoor heat exchanger, one end of the pipe 510 is connected to an exit of the expander, and the other end of the pipe 510 is connected to an entrance of the compressor.

The pipe 510 includes a linear part 510a and a curved part 510b. The linear part 510a extends in a direction intersecting the flow direction of air, and is arranged in a plurality of lines. The curved part 510b connects the linear parts 510 to each other to form the pipe 510 having a zigzag shape.

The groove 201 or 301 described in FIG. 9 or 10 may be formed in the inner circumferential surface of the pipe 510. The groove 201 or 301 generates turbulence of the refrigerant flowing in the pipe 510 and enlarges a heat exchange area of the pipe 510.

The cooling fins 520 are disposed along the length direction of the pipe 510 to be spaced apart from each other. Air is indirectly heat-exchanged with the refrigerant through the cooling fins 520 while passing between the cooling fins 520.

The two pipe supporting platforms 530 are formed in a quadrangular shape, and are disposed opposite to each other. Holes for accommodating and supporting the pipe 510 are formed in each of the pipe supporting platforms 530. The curved part 510b of the pipe 510 is inserted and fixed into the hole.

Since the pipe 510 of the fin-tube heat exchanger 500 includes the curved part 510b, plastic deformation is to be caused by applying a bending stress to a linear pipe so as to form the curved part 510b. However, since a conventional stainless steel has properties of excessively high strength and excessively high hardness as compared with copper, the conventional stainless steel may not be sufficiently plastically deformed even when the bending stress is applied to a linear pipe, and it may be difficult to form a curved part.

However, the stainless steel according to an embodiment of the present invention has properties low strength and low hardness, which are similar to those of copper, through the composition, matrix structure, and average diameter, which are described above. Accordingly, when the pipe of the fin-tube heat exchanger 500 is manufactured using the stainless steel according to an embodiment of the present invention, a sufficient plastic deformation can be caused by applying a bending stress to a linear pipe, and the linear part 510a and the curved part 510b can be manufactured in a designed shape. Further, it is possible to reduce or prevent the occurrence of distortion through grooves formed in the pipe 510 in the process of applying the bending stress.

Hereinafter, a process of manufacturing a pipe using a stainless steel will be described with reference to FIGS. 14 and 15A to 15D.

Figure 14:
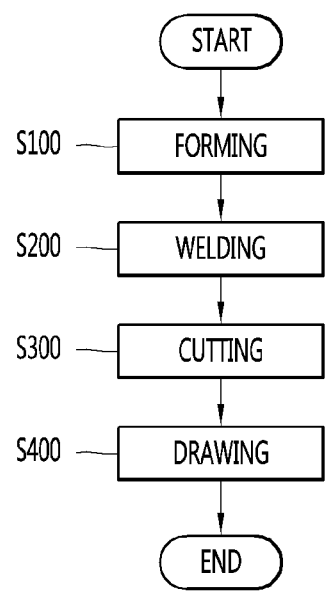
FIG. 14 is a flowchart showing a method for manufacturing a pipe using a stainless steel.

FIG. 14 is a flowchart illustrating a method for manufacturing a pipe using a stainless steel. FIGS. 15A to 15D are sectional views illustrating a process of manufacturing the pipe using the stainless steel according to the method of FIG. 14.

A pipe made of copper is formed through a single process called drawing. However, because a pipe made of stainless steel has high strength and high hardness as compared with copper, the pipe made of stainless steel may not be formed through a single process.

A pipe made of the stainless steel according to an embodiment of the present invention can be manufactured through a sequence of forming (S100), welding (S200), cutting (S300), and drawing (S400).

Figure 15A:
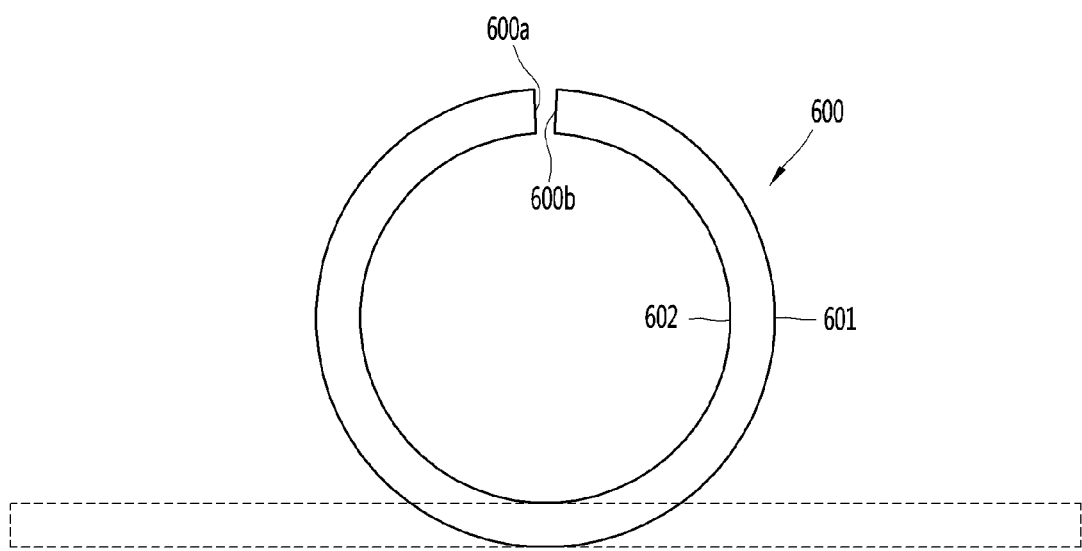
FIGS. 15A to 15D are sectional views showing a process of manufacturing the pipe using the stainless steel according to the method of FIG. 14.

The forming (S100) is a process of forming a shape of the pipe by rolling a sheet 600 made of the stainless steel. The forming may be performed using a plurality of rollers. In FIG. 15A, it is illustrated that the shape of the pipe is formed by rolling the sheet.

Figure 15B:
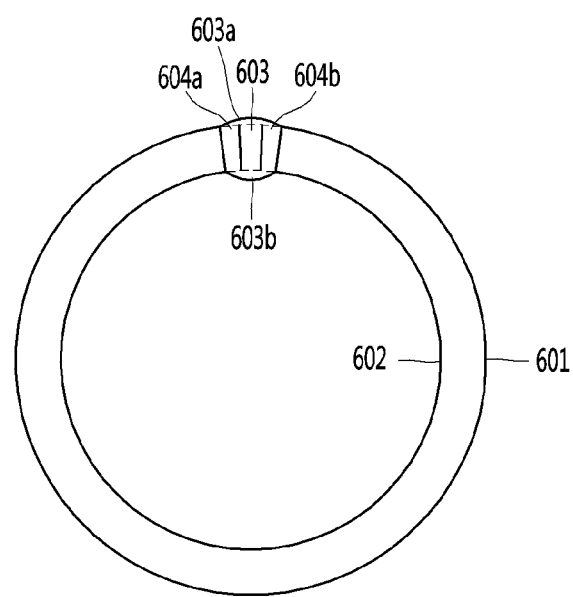

The welding (S200) is a process of allowing both ends 600a and 600b of the stainless steel, which are close to each other, by rolling the stainless steel in the forming, to be adhered to each other. FIG. 15B illustrates a result obtained by rolling the sheet made of the stainless steel and welding both the ends of the sheet.

As both the ends 600a and 600b of the stainless steel are welded in the length direction of the pipe, both the ends 600a and 600b are adhered to each other. A weld zone 603 is formed along the length direction of the pipe through the welding. Referring to FIG. 15B, since beads 603a and 603b that respectively slightly protrude to an outer circumferential surface 601 and an inner circumferential surface 602 of the pipe are formed at the weld zone 603, the outer circumferential surface 601 and the inner circumferential surface 602 of the pipe do not become smooth surfaces so far.

Heat affected zones (HAZs) 604a and 604b are respectively formed at both sides of the weld zone 603 by heat generated in the welding. Like the weld zone 603, the HAZs 604a and 604b are also formed along the length direction of the pipe.

Figure 15C:
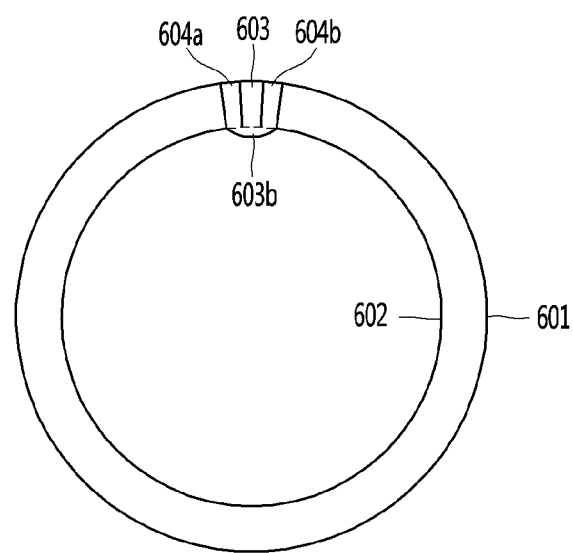

The cutting (S300) is a process of partially cutting the bead 603a of the weld zone 603 to allow the outer circumferential surface 601 to become the smooth surface. The cutting may be consecutively performed with the welding. The cutting may be performed through a process of partially cutting the bead 603a using a bite while moving the pipe in the length direction thereof through press bead rolling. FIG. 15C illustrates a stainless steel pipe that has been sequentially subject to the forming, the welding, and the cutting.

Figure 15D:
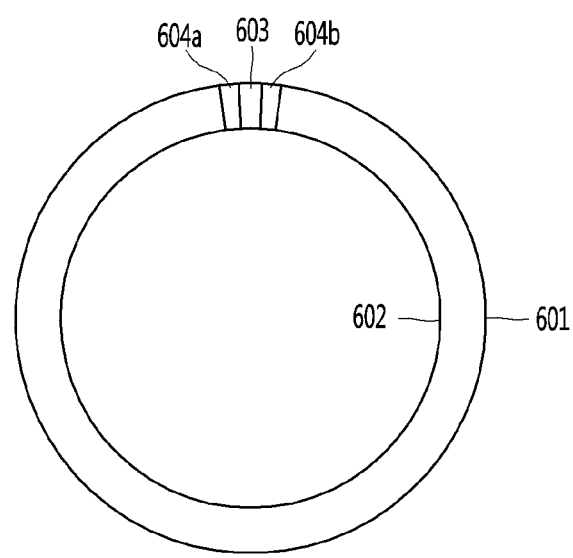

The drawing (S400) is a process of allowing the inner circumferential surface 602 of the pipe to become a smooth surface by applying an external force to the bead 603b of the weld zone 603. If the pipe is pulled through dies in a state in which a plug is located at an entrance of the pipe, an external force is applied to the bead 603b, so that the inner circumferential surface 602 of the pipe is formed as a smooth surface. FIG. 15D illustrates a stainless steel pipe that has been sequentially subject to the forming, the welding, the cutting, and the drawing.

After the drawing, grooves may be additionally formed in the outer circumferential surface and the inner circumferential surface of the pipe.

The outer circumferential surface 601 and the inner circumferential surface 602 of the pipe are formed as smooth surfaces through the cutting and the drawing so as to form a uniform internal diameter in the pipe and connect the pipe to another pipe. In addition, the uniform internal diameter is formed in the pipe so as to allow a refrigerant to smoothly flow and constantly maintain the pressure of the refrigerant as described above.

Hereinafter, a pipe including the outer circumferential surface 601 and the inner circumferential surface 602, which are formed as smooth surfaces to be connected to another pipe, will be described.

Figure 16:
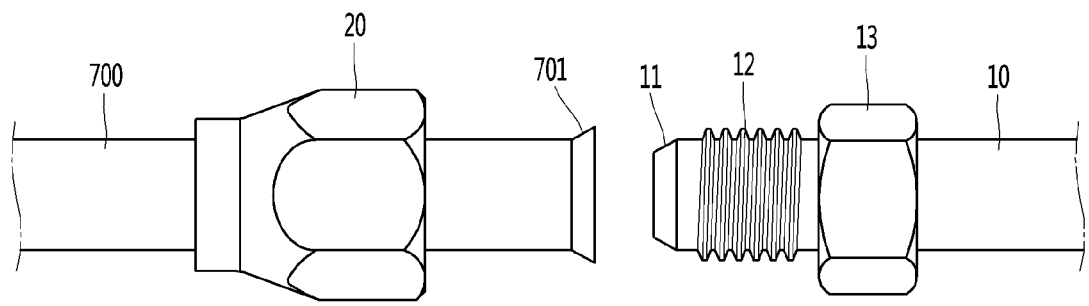
FIG. 16 is a conceptual view showing a connection between a pipe made of a stainless steel and another pipe.

FIG. 16 is a conceptual view illustrating a connection between a pipe 700 made of a stainless steel and another pipe 10.

In order to connect the pipe 700 made of the stainless steel to the other pipe 10, an end part 701 of the stainless steel pipe 700 is processed for enlargement. If the end part 701 of the stainless steel pipe 700 is enlargement-processed such that the internal diameter of the stainless steel pipe 700 is gradually increased as the stainless steel pipe 700 approaches the end thereof, the end part 701 of the stainless steel pipe 700 is processed in a Y shape or a trumpet shape as illustrated in FIG. 16.

An end part 11 of the other pipe 10 has an inclined section to correspond to the enlargement-processed end part 701 of the stainless steel pipe 700. As illustrated in FIG. 16, the external diameter of the end part 11 of the other pipe 10 is gradually narrowed as the end part 11 approaches the end thereof. Here, the other pipe 10 is not necessarily made of the stainless steel.

A screw thread 12 is formed at an outer circumferential surface of the other pipe 10. If a nut 20 coupled to an outer circumferential surface of the stainless steel pipe 700 is screw-coupled to the screw thread 12 formed at the outer circumferential surface of the other pipe 10 in a state in which the stainless steel pipe 700 and the other pipe 10 are adhered closely to each other, the nut 20 is fastened to the other pipe 10 while rotating until the nut 20 becomes close to a stop part 13, and accordingly, the stainless steel pipe 700 and the other pipe 10 are coupled to each other.

If the stainless steel pipe 700 is not subject to cutting and drawing in a process of manufacturing the stainless steel pipe 700, a weld zone partially protrudes from each of outer and inner circumferential surfaces of the stainless steel pipe 700, and the outer and inner circumferential surfaces are not formed as smooth surfaces. If the outer and inner circumferential surfaces of the stainless steel pipe 700 are not formed as smooth surfaces, rupture may occur from the weld zone in the process of enlargement-processing the stainless steel pipe 700, and the connection of the stainless steel 700 to the other pipe 10 may be difficult. Therefore, it may become a precondition for connecting the stainless steel pipe 700 to the other pipe 10 to form the outer and inner circumferential surfaces as smooth surfaces through a process such as cutting or drawing.

Hereinafter, a minimum thickness at which the stainless steel pipe has a critical pressure and a critical bending moment, which are similar to those of a copper pipe, will be described.

The critical pressure refers to a pressure under which a pipe is completely fired and then destroyed. In addition, the critical bending moment refers to a moment at which a pipe is completely fired and then destroyed by a bending load.

The stainless steel according to an embodiment of the present invention has properties of low strength and low hardness as compared with the convention stainless steel, but still has properties of high strength and high hardness as compared with copper. Therefore, even when a stainless steel pipe according to an embodiment of the present invention is formed with a thickness smaller than that of a copper pipe, the stainless steel pipe may have a critical pressure and a critical bending moment, which are similar to those of a copper pipe. Thus, if the maximum thickness of the stainless steel pipe is set to that of a commercial copper pipe, the stainless steel pipe can have a sufficient critical pressure and a sufficient critical bending moment, and it may not be necessary to separately consider the maximum thickness of the stainless steel pipe.

Here, the minimum thickness of the stainless steel pipe, at which the stainless steel pipe has a critical pressure and a critical bending moment, which are similar to those of a copper pipe, will be described.

In the following description, a metallic material as a ductile material is most frequently used for analysis, and the minimum thickness of the stainless steel pipe has been calculated according to the VON Mises failure criterion that has been most widely known until a recent date as a criterion for predicting the failure of an object. Consequently, the thickness of the stainless pipe will have a value calculated herein as a minimum value and have a thickness of a commercial copper pipe as a maximum value.

Figure 17:
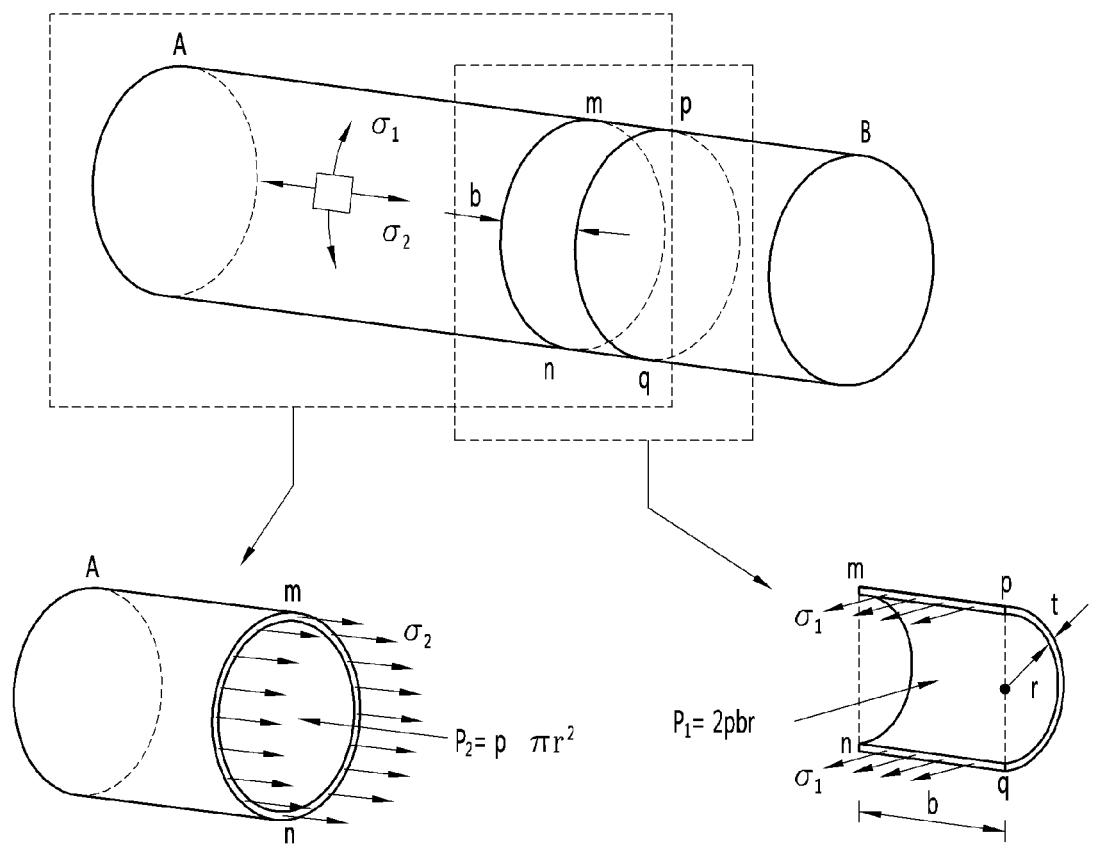
FIG. 17 is a conceptual view showing a stainless steel pipe represented in a cylindrical coordinate system.

FIG. 17 is a conceptual view illustrating a stainless steel pipe represented in a cylindrical coordinate system.

Based on the cylindrical coordinated system, a critical pressure $P_0$ is calculated from a yield strength $\sigma_0$ as follows.

$$\sigma_0 = \frac{1}{\sqrt{2}}\sqrt{(\sigma_1 - \sigma_2)^2 + (\sigma_2 - \sigma_3)^2 + (\sigma_3 - \sigma_1)^2}$$

$$\left(\text{Plane\_stress} \rightarrow \sigma_1 = \frac{Pr}{t}, \sigma_2 = \frac{Pr}{2t}, \sigma_3 \approx 0\right)$$

$$P_0 = \frac{2}{\sqrt{3}}\frac{t}{r}\sigma_0$$

Here, $\sigma_1$ denotes a hoop stress that acts in a circumferential direction, $\sigma_2$ denotes an axial stress that acts in an axial direction, and $\sigma_3$ denotes a radial stress that acts in a radial direction.

Figure 18:
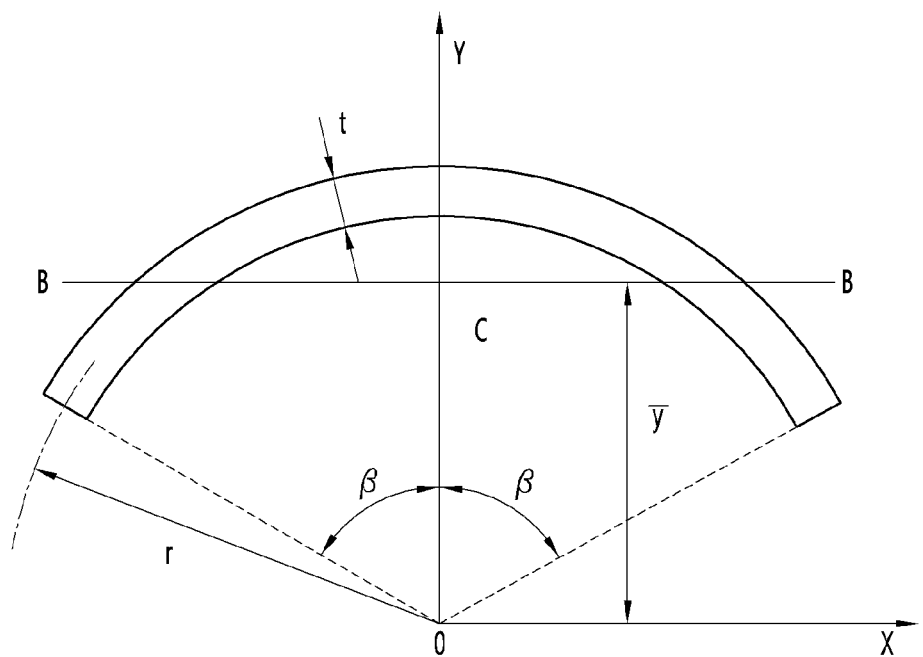
FIG. 18 is a conceptual view showing a section of the stainless steel pipe, which is represented in a two-dimensional coordinate system.

FIG. 18 is a conceptual view illustrating a section of the stainless steel pipe, which is represented in a two-dimensional coordinate system.

Based on the two-dimensional coordinate system, a critical bending moment $M_0$ is calculated as follows.

$$F_L = 2F_1 = 2(A_1 \times P)$$
$$= 2 \times \frac{1}{2}(\pi r_0^2 - \pi r_1^2) \times \sigma_0 = 2\pi rt\sigma_0$$

$$\overline{y_1} = \frac{r \times \sin\beta}{\beta} = \frac{2r}{\pi}$$

$$M_0 = F_L \times \overline{y_1} = 4r^2 t\sigma_0$$

Here, $F_L$ denotes an external force that causes complete plastic deformation of the stainless steel pipe, $F_1$ denotes an external force applied to one side with respect to a neutral axis of the stainless steel pipe, and $A_1$ denotes an area at one side with respect to the neutral axis of the stainless steel pipe.

In addition, P denotes the yield strength $\sigma_0$ calculated above, $\overline{y_1}$ denotes a distance from the neutral axis of the stainless steel pipe to the center of figure of $A_1$, and r denotes an average radius (an average of outer and inner radii).

According to P0 and M0, which are calculated as described above, sizes of the stainless steel pipe are shown in the following tables. Table 3 shows sizes of a stainless steel linear pipe, and Table 4 shows sizes of a copper linear pipe so as to compare the stainless steel linear pipe with the copper linear pipe. In addition, Table 5 shows sizes of stainless steel bent pipes, and Table 6 shows sizes of copper bent pipes so as to compare the stainless steel bent pipes with the copper bent pipes.

TABLE 3

| Outer diameter ($D_0$) [mm] | Thickness (t) [mm] | Outer radius ($r_0$) [mm] | Average radius (r) [mm] | Yield strength ($\sigma_0$) [MPa] | Limited pressure ($P_0$) [MPa] |
|---|---|---|---|---|---|
| 19.05 | 0.5 | 9.525 | 9.275 | 200 | 12.45 |

TABLE 4

| Outer diameter ($D_0$) [mm] | Thickness (t) [mm] | Outer radius ($r_0$) [mm] | Average radius (r) [mm] | Yield strength ($\sigma_0$) [MPa] | Limited pressure ($P_0$) [MPa] |
|---|---|---|---|---|---|
| 19.05 | 1 | 9.525 | 9.025 | 100 | 12.79 |

The outer diameter of the copper linear pipe is 19.05 mm, and the thickness of the copper linear pipe is 1.0 mm. If the thickness of the stainless steel linear pipe having the same outer diameter as the copper linear pipe is 0.5 mm or more, the stainless steel linear pipe may have a critical pressure similar to that of the copper linear pipe.

Since the outer diameter of the commercial copper linear pipe is 19.05 mm or more, the outer diameter of the stainless steel linear pipe may also be designed to be 19.05 mm or more. In addition, the thickness of the stainless steel linear pipe may be designed to be 0.5 to 1.0 mm such that the stainless steel linear pipe has a critical pressure similar to that of the copper linear pipe. The maximum thickness of the stainless steel linear pipe was designed to be the thickness of the copper linear pipe.

TABLE 5

| Outer diameter ($D_0$) [mm] | Thickness (t) [mm] | Outer radius ($r_0$) [mm] | Average radius (r) [mm] | Yield strength ($\sigma_0$) [MPa] | Limited pressure ($P_0$) [MPa] | Limited bending moment ($M_0$) [N·mm] |
|---|---|---|---|---|---|---|
| 19.05 | 0.6 | 9.525 | 9.225 | 180 | 13.52 | 36753.47 |
| 15.88 | 0.6 | 7.94 | 7.64 | 180 | 16.32 | 25215.67 |
| 12.7 | 0.6 | 6.35 | 6.05 | 180 | 20.61 | 15812.28 |
| 9.52 | 0.5 | 4.76 | 4.51 | 180 | 23.04 | 7322.44 |
| 6.35 | 0.4 | 3.175 | 2.975 | 180 | 27.95 | 2548.98 |

TABLE 6

| Outer diameter ($D_0$) [mm] | Thickness (t) [mm] | Outer radius ($r_0$) [mm] | Average radius (r) [mm] | Yield strength ($\sigma_0$) [MPa] | Limited pressure ($P_0$) [MPa] | Limited bending moment ($M_0$) [N·mm] |
|---|---|---|---|---|---|---|
| 19.05 | 1 | 9.525 | 9.225 | 100 | 12.79 | 32580.25 |
| 15.88 | 1 | 7.94 | 7.44 | 100 | 15.52 | 22141.44 |
| 12.7 | 0.8 | 6.35 | 5.95 | 100 | 15.53 | 11328.80 |
| 9.52 | 0.8 | 4.76 | 4.36 | 100 | 21.19 | 6083.07 |
| 6.35 | 0.7 | 3.175 | 2.825 | 100 | 28.61 | 2234.58 |

If the thickness of a stainless steel bent pipe having the same outer diameter as the copper bent pipe having an outer diameter of 15.88 to 19.05 mm is 0.6 mm or more, the stainless steel bent pipe may have a critical pressure and a critical bending moment, which are similar to those of the copper bent pipe. Therefore, the thickness of a stainless steel bent pipe having the outer diameter of 15.88 to 19.05 mm may be designed to be 0.6 to 1.0 mm.

If the thickness of a stainless steel bent pipe having the same outer diameter as the copper bent pipe having an outer diameter of 12.7 to 15.88 mm is 0.6 mm or more, the stainless steel bent pipe may have a critical pressure and a critical bending moment, which are similar to those of the copper bent pipe. Therefore, the thickness of the stainless steel bent pipe having the outer diameter of 12.7 to 15.88 mm may be designed to be 0.6 to 0.8 mm.

If the thickness of a stainless steel bent pipe having the same outer diameter as the copper bent pipe having an outer diameter of 9.52 to 12.7 mm is 0.5 mm or more, the stainless steel bent pipe may have a critical pressure and a critical bending moment, which are similar to those of the copper bent pipe. Therefore, the thickness of the stainless steel bent pipe having the outer diameter of 9.52 to 12.7 mm may be designed to be 0.5 to 0.8 mm.

If the thickness of a stainless steel bent pipe having the same outer diameter as the copper bent pipe having an outer diameter of 6.35 to 9.52 mm is 0.4 mm or more, the stainless steel bent pipe may have a critical pressure and a critical bending moment, which are similar to those of the copper bent pipe. Therefore, the thickness of the stainless steel bent pipe having the outer diameter of 6.35 to 9.52 mm may be designed to be 0.4 to 0.7 mm.

The maximum thickness of the stainless steel bent pipe was designed to be the thickness of the copper bent pipe.

The stainless steel and the pipe made thereof, which are described above, are not limited to the configurations and methods of the above-described embodiments, and all or some of the embodiments may be selectively combined to achieve various modifications.

INDUSTRIAL APPLICABILITY

An embodiment of the present invention can be used in a pipe made of stainless steel and a system such as an air conditioner including the pipe thereof.

The invention claimed is:
1. A system including a pipe connected with at least one of a compressor, a heat exchanger and a valve provided in an air conditioner, the pipe being made of a stainless steel, the stainless steel comprising, percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, and Cu: 1.0 to 4.0%, Mo: exceeding 0 to 0.03% or less, P: exceeding 0 to 0.04% or less, S: exceeding 0 to 0.04% or less and N: exceeding 0 to 0.03% or less,
    wherein the stainless steel has an austenite matrix structure and an average diameter of 30 μm to 60 μm for austenite grains,
    wherein the stainless steel has an austenite matrix structure of 99% or more and a δ-ferrite matrix structure of exceeding 0 to 1% or less based on the grain size area thereof, and
    wherein the pipe is formed as a linear pipe, and an outer diameter of the linear pipe is 19.05 mm and a thickness of the linear pipe is 0.5 mm or more,
    wherein the system further comprises a copper pipe coupled to the linear pipe, wherein the copper pipe includes a first copper pipe joined at a first end of the linear pipe and a second copper pipe joined at a second end of the linear pipe, and wherein the linear pipe includes a corrugated part provided at an outer circumferential surface thereof.

2. The system of claim 1, further comprising:

a weld zone formed along a length direction of the linear pipe;

heat affected zones (HAZs) respectively formed at both sides of the weld zone along the length direction of the linear pipe; and the outer circumferential surface and an inner circumferential surface formed as smooth surfaces.

3. The system of claim 2, wherein the linear pipe has grooves formed in at least one of the inner and outer circumferential surfaces.

4. The system of claim 3, wherein the grooves includes:

a plurality of first grooves formed in the inner circumferential surface of the linear pipe, the plurality of first grooves being spaced apart from each other along the length direction of the linear pipe; and a plurality of second grooves formed in the outer circumferential surface of the linear pipe, the plurality of second grooves being spaced apart from each other along the length direction of the linear pipe.

5. A system including a pipe connected with at least one of a compressor, a heat exchanger and a valve provided in an air conditioner, the pipe being made of a stainless steel, the stainless steel comprising, percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, and Cu: 1.0 to 4.0%, Mo: exceeding 0 to 0.03% or less, P: exceeding 0 to 0.04% or less, S: exceeding 0 to 0.04% or less and N: exceeding 0 to 0.03% or less, wherein the stainless steel has an austenite matrix structure and an average diameter of 30 μm to 60 μm for austenite grains, wherein the stainless steel has an austenite matrix structure of 99% or more and a δ-ferrite matrix structure of exceeding 0 to 1% or less based on the grain size area thereof, and wherein the pipe is formed as a bent pipe, an outer diameter of the bent pipe is 19.05 mm and a thickness of the bent pipe is 0.6 mm or more, wherein the system further comprises a copper pipe coupled to the bent pipe, wherein the copper pipe includes a first copper pipe joined at a first end of the bent pipe and a second copper pipe joined at a second end of the bent pipe; and wherein the bent pipe includes a corrugated part provided at an outer circumferential surface thereof.

6. The system of claim 5, wherein the bent pipe has grooves formed in at least one of the outer circumferential surface and an inner circumferential surface, wherein the grooves includes:

a plurality of first grooves formed in the inner circumferential surface of the bent pipe, the plurality of first grooves being spaced apart from each other along a length direction of the bent pipe; and a plurality of second grooves formed in the outer circumferential surface of the bent pipe, the plurality of second grooves being spaced apart from each other along the length direction of the bent pipe.

* * * * *